(12) United States Patent
Sui et al.

(10) Patent No.: US 10,897,689 B2
(45) Date of Patent: Jan. 19, 2021

(54) MULTICAST SYSTEM, METHOD, AND APPARATUS

(71) Applicant: TELEFONAKTIEBOLAGET LM ERICSSON (PUBL), Stockholm (SE)

(72) Inventors: Yutao Sui, Solna (SE); Antti Ratilainen, Espoo (FI); Karin Hedén, Sundbyberg (SE); Tuomas Tirronen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 95 days.

(21) Appl. No.: 16/305,101

(22) PCT Filed: Jun. 22, 2017

(86) PCT No.: PCT/SE2017/050699
§ 371 (c)(1),
(2) Date: Nov. 28, 2018

(87) PCT Pub. No.: WO2017/222467
PCT Pub. Date: Dec. 28, 2017

(65) Prior Publication Data
US 2020/0053516 A1   Feb. 13, 2020

Related U.S. Application Data

(60) Provisional application No. 62/353,592, filed on Jun. 23, 2016.

(51) Int. Cl.
*H04W 4/08* (2009.01)
*H04W 72/04* (2009.01)
(Continued)

(52) U.S. Cl.
CPC ............. *H04W 4/08* (2013.01); *H04L 5/0005* (2013.01); *H04W 4/70* (2018.02); *H04W 72/0453* (2013.01); *H04W 72/121* (2013.01)

(58) Field of Classification Search
CPC ..... H04W 4/08; H04W 4/70; H04W 72/0453; H04W 72/121; H04W 72/005; H04L 5/0005
See application file for complete search history.

(56) References Cited

U.S. PATENT DOCUMENTS 8,670,432 B2   3/2014  Luo
9,055,515 B2   6/2015  Sartori et al.
(Continued)

FOREIGN PATENT DOCUMENTS

RU      2573249 C2      1/2016
WO   2012150310 A1    11/2012
(Continued)

OTHER PUBLICATIONS

3GPP TS 36.321, "3rd Generation Partnership Project; Technical Specification Group Radio Access Network; Evolved Universal Terrestrial Radio Access (E-UTRA); Medium Access Control (MAC) protocol specification (Release 13)", v13.1.0, Mar. 2016.
(Continued)

*Primary Examiner* — Hoang-Chuong Q Vu
(74) *Attorney, Agent, or Firm* — Patent Portfolio Builders PLLC

(57) ABSTRACT

Method by a first network node in a wireless communications network. The network comprises a first group of wireless devices supporting transmission with a first bandwidth under a threshold and a second group supporting transmission with a second bandwidth over the threshold. The first network node configures a wireless device in the first group having a first set of time-frequency resources to carry a first type of information with: at least one second set to carry a second type. The second type is to be transmitted simultaneously to the first group. The first type is to be transmitted to at least one of: i) the first group and the second group, and ii) the wireless device. The first set and the at (Continued)

least one second set of time-frequency resources are in different sets of frequencies or are in different transmission time periods, or both.

44 Claims, 9 Drawing Sheets

(51) Int. Cl.
*H04L 5/00* (2006.01)
*H04W 4/70* (2018.01)
*H04W 72/12* (2009.01)

(56) References Cited

U.S. PATENT DOCUMENTS

| | | | | |
|---|---|---|---|---|
| 10,200,937 | B2* | 2/2019 | Chai | H04W 48/10 |
| 10,602,481 | B2* | 3/2020 | Chen | H04W 4/70 |
| 2012/0213143 | A1* | 8/2012 | Zhang | H04L 5/001 |
| | | | | 370/312 |
| 2012/0289286 | A1* | 11/2012 | Miki | H04W 48/12 |
| | | | | 455/552.1 |
| 2013/0148607 | A1* | 6/2013 | Yu | H04L 61/103 |
| | | | | 370/329 |
| 2013/0339438 | A1* | 12/2013 | Cherian | H04W 8/186 |
| | | | | 709/204 |
| 2015/0223028 | A1* | 8/2015 | Wang | H04W 4/08 |
| | | | | 370/312 |
| 2016/0037514 | A1* | 2/2016 | Xiong | H04W 4/70 |
| | | | | 370/336 |
| 2016/0205692 | A1* | 7/2016 | Zhang | H04W 48/12 |
| | | | | 370/329 |
| 2016/0301503 | A1* | 10/2016 | Rico Alvarino | H04L 5/0012 |
| 2016/0316374 | A1* | 10/2016 | Xu | H04W 4/70 |
| 2018/0152862 | A1* | 5/2018 | Nagasaka | H04W 28/08 |
| 2019/0174554 | A1* | 6/2019 | Deenoo | H04W 80/02 |

FOREIGN PATENT DOCUMENTS

| | | |
|---|---|---|
| WO | 2014098700 A1 | 6/2014 |
| WO | 2016164865 A1 | 10/2016 |

OTHER PUBLICATIONS

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 13)", v13.1.0, Mar. 2016.

3GPP TSG RAN Meeting #71, "New WI proposal for L1/L2 eMTC and NB-IOT enhancements in LTE", RP-160201, Mar. 7-10, 2016, Goteborg, Sweden.

3GPP TSG RAN Meeting #72, "New WI proposal on further enhancement of cellular IoT for LTE", RP-161175, Jun. 13-16, 2016, Busan, Korea.

3GPP TSG-RAN WG1 Meeting #84, "RAN1 agreements for Rel-13 NB-IoT", R1-161548, Feb. 15-19, 2016, St. Julian's, Malta, pp. 1-11.

3GPP TSG-RAN1 #84, "NB-IoT—NB-PBCH design", R1-160259, Feb. 15-19, 2016, St. Julian's, Malta, pp. 1-4.

Decision to Grant in corresponding/related Russian Application No. 2019101637 dated Dec. 19, 2019. (All references not cited herewith have been previously made of record.).

International Search Report in corresponding/related International Application No. PCT/SE2017/050699 dated Sep. 15, 2017. (All references not cited herewith have been previously made of record.).

Written Opinion in corresponding/related International Application No. PCT/SE2017/050699 dated Sep. 15, 2017. (All references not cited herewith have been previously made of record.).

* cited by examiner a)

b)

a)

b)

a)

b)

MULTICAST SYSTEM, METHOD, AND APPARATUS

TECHNICAL FIELD

The present disclosure relates generally to a first network node and methods performed therein for configuring a wireless device with time-frequency resources. The present disclosure also relates generally to the wireless device, and methods performed therein for configuring the wireless device with time-frequency resources. The present disclosure further relates generally to a computer program product, comprising instructions to carry out the actions described herein, as performed by the first network node, or the wireless device. The computer program product may be stored on a computer-readable storage medium.

BACKGROUND

Communication devices within a wireless communications network may be wireless devices such as e.g., User Equipments (UE), mobile terminals, wireless terminals, terminals, and/or Mobile Stations (MS). Wireless devices are enabled to communicate wirelessly in a cellular communications network or wireless communications network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

A wireless communications network covers a geographical area which may be divided into cell areas, each cell area being served by a communication device which may be an access node such as a base station, e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g., Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the wireless device. The expression Uplink (UL) is used for the transmission path in the opposite direction i.e., from the wireless device to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission in LTE is controlled by the radio base station.

The Internet of Things (IoT) and Machine-Type Communication (MTC)

The Internet of Things (IoT) may be understood as relating to a vision for the future world where everything that may benefit from a data connection may be connected. Radio technologies are being developed or evolved to enable the IoT world. Machine-Type Communication (MTC) is a form of data communication which involves one or more entities that do not necessarily need human interaction. MTC devices are devices which communicate through MTC. In some particular examples, MTC devices are wireless devices equipped for Machine-Type Communication, as just described, which wireless devices may communicate through a Public Land Mobile Network (PLMN) with MTC Server(s) and/or other MTC Device(s). An MTC Server is a server, which communicates to the PLMN itself, and to MTC Devices through the PLMN. The MTC Server also has an interface which may be accessed by an MTC User. The MTC Server performs services for the MTC User. An MTC User may use the service provided by the MTC Server. MTC devices may be, for example, home and/or building automation devices, alarms, emission control, toll payment devices, people tracking devices, parcel tracking devices, sensor networks, industrial automation devices, personal network devices etc.

Given the lesser capabilities of low cost MTC devices, such as those having only one antenna, etc, and the fact that MTC devices often are to be placed in basements and locations with poor coverage, coverage enhancements may be an important enabler for these devices. 3GPP has introduced a category of devices, e.g., UE category 0, to accommodate these lower capacity MTC devices. To improve coverage, more energy, in general, may need to be accumulated in the time or frequency domain. Typically, since the devices may be power limited, it may make sense to use the time domain and transmit narrow band in UL, to provide a higher UL capacity, so that other UEs may use the remaining bandwidth. In a Release 12 work item in 3GPP, repetitions in time have been proposed for extending the coverage of MTC devices of up to 15 dB. More repetitions increase the received energy, which results in a higher signal-to-noise ratio, and thus, in an extension of the coverage of the signals transmitted and received by the MTC devices.

One problem with coverage enhancements is that the transmission of a given amount of data becomes much more expensive in terms of resource consumption. In the case of repetitions, for example, each transmission may have to be repeated over a hundred times.

Bandwidth Limited UEs

There has been a lot of work in 3GPP lately on specifying technologies to cover Machine-to-Machine (M2M) and/or Internet of Things (IoT) related use cases. Most recently, work for 3GPP Release 13 includes enhancements to support Machine-Type Communications (MTC) with a new UE category M1 (Cat-M1), supporting reduced bandwidth of up to 6 Physical Resource Blocks (PRBs), and a Narrowband IoT (NB-IoT) work item specifying a new radio interface and UE category Narrow band 1 (NB1), Cat-NB1. A PRB may be understood as a unit of transmission resource consisting of 12 sub-carriers in the frequency domain, that is, 180 kHz wide in frequency, and 1 timeslot (0.5 ms) in the time domain.

Herein, the LTE enhancements introduced in 3GPP Release 13 for MTC are referred to as "eMTC", including, but not limited to, support for bandwidth limited UEs, Cat-M1 UEs, and support for coverage enhancements. A further technology is NB-IoT, whose supported features are similar on a general level.

Multi-PRB Operation

For NB-IoT, three different operation modes may be defined, i.e., stand-alone, guard-band, and in-band. In stand-alone mode, the NB-IoT system may be operated in dedicated frequency bands. For in-band operation, the NB-IoT system may be placed inside the frequency bands used by the current LTE system, while in the guard-band mode, the NB-IoT system may be operated in the guard band used by the current LTE system. The NB-IoT may operate with a system bandwidth of 180 kHz, which may be understood to correspond to one PRB. When multi-PRBs are configured [1], several 180 kHz PRBs may be used, e.g., for increasing the system capacity, inter-cell interference coordination, load balancing, and etc.

Multi-PRB operations, that is, operations using multiple PRBs, may be used in order to adapt to certain use cases that may require more capacity than usual, e.g., software or firmware upgrade [1]. An NB-IoT device may listen to the system information on the anchor PRB, but when there is data, the communication may be moved to a secondary PRB. Several multi-PRB configurations are shown in FIGS. 1, 2, 3, and 4, each comprising an anchor carrier, or PRB, 1, and a first secondary carrier, or PRB, 2 and wherein FIGS. 1 and 2, each further comprise a second secondary carrier, or PRB, 3.

FIG. 1 is a schematic diagram illustrating an example of a multi-PRB configuration wherein the anchor carrier is standalone, and the secondary carriers are other standalone carriers. A first PRB, PRB 1, is an anchor carrier carrying information for two different UEs, UE1 and UE2. A first secondary carrier k, PRB 2, carries further information about UE2, and a second secondary carrier j, PRB 2, carries further information about UE1.

FIG. 2 is a schematic diagram illustrating another example of a multi-PRB configuration, with a similar description to that provided in FIG. 1, but wherein the anchor PRB/carrier is inband, and the secondary PRB/carrier is inband.

FIG. 3 is a schematic diagram illustrating another example of a multi-PRB configuration wherein the anchor PRB/carrier is inband, and the secondary PRB/carrier is in guardband adjacent to the LTE system bandwidth. The arrow here indicates that a UE may be redirected from an anchor carrier to a secondary non-anchor carrier via signaling.

FIG. 4 is a schematic diagram illustrating another example of a multi-PRB configuration wherein the anchor PRB/carrier is guardband, and the secondary PRB/carrier k, PRB 2, is inband. As in FIG. 3, the arrow here indicates that a UE may be redirected from an anchor carrier to a secondary non-anchor carrier via signaling.

A DL Anchor PRB or carrier in the current disclosure may be understood as where the NB-IoT Primary Synchronization Sequence (NB-PSS)/Secondary Synchronization Sequence (NB-SSS), NB-PBCH and SIB transmissions take place, based on the agreement in [1], "The UE in RRC_IDLE camps on the NB-IoT carrier on which the UE has received NB-PSS/SSS, NB-PBCH and SIB transmissions".

An UL Anchor PRB or carrier in the current disclosure may be understood as the UL frequency that may be signaled to the NB-IoT device via higher layer signaling, based also on the agreement in [1], "For initial access, the NB-IoT DL/UL frequency separation is configured by higher layers (SIBx) and is cell-specific" and "After the initial random access procedure success, there can also be a UE specific configuration for the NB-IoT DL/UL frequency separation". Note that, based on the agreement in [1], the UL anchor PRB may be, although not necessarily is, different from the PRB where the initial random access may take place.

Multicast and Broadcast Services

In the LTE specifications, multicast and broadcast services have been specified under Multimedia Broadcast Multicast Services (MBMS), enabling transmission of the same content to multiple UEs, in a specified area, at the same time. In multicast services, transmission may be performed to multiple UEs at the same time, that is, to a group of UEs. In broadcast services, transmission may be performed to all UEs in a system, cell or area at the same time.

Neither Cat-M1 UEs nor NB-IoT UEs, that is Cat-NB1 UEs, support MBMS at the moment. However, for many IoT use cases, multicast support would be an important feature to have. Example use cases may include transmission of a firmware update to a large number of sensors, or other devices, or sending a command to a large number of actuators at the same time. Currently, such transmissions/commands would need to be transmitted to each receiving UE separately using unicast. However, using multicast to transmit the same transmission/command to a large number of UEs with a single transmission would reduce the time needed to deliver the message and the radio resources required, thus increasing spectral efficiency.

At the 3GPP RAN #70 meeting, a new work item named Narrowband IoT (NB-IoT) was approved. The objective is to specify a radio access for cellular internet of things that addresses improved indoor coverage, support for massive number of low throughput devices, low delay sensitivity, ultra-low device cost, low device power consumption and (optimized) network architecture.

There are multiple differences between "legacy" LTE and the procedures and channels defined for the eMTC work, and likewise for NB-IoT. Some differences include a new physical downlink control channel, called Physical Downlink Control Channel for Bandwidth Limited (BL) UEs and UEs in enhanced coverage (MPDCCH) used in eMTC, and Narrowband Physical Downlink Control Channel (NPDCCH) used in NB-IoT.

Multicast support does not exist for eMTC or NB-IoT. One reason relates to the procedures and channels defined for the eMTC network and for NB-IoT. In addition, the available bandwidth for transmission of multicast data is limited. Therefore, transmission of multicast repetitions, which may be needed by wireless devices with limited bandwidth is also limited. As a consequence, the ability of these wireless devices with limited bandwidth to receive and transmit multicast data is impaired.

SUMMARY

At the 3GPP RAN #72, new Work Items were approved for both eMTC and NB-IoT which both include as objectives: a) to extend Rel-13 Single-Cell Point-to-Multipoint (SC-PTM) to support multicast downlink transmission, e.g., firmware or software updates, group message delivery, etc., and b) introduction of necessary enhancements to support narrowband operation, e.g., support of MPDCCH and/or NPDCCH, and coverage enhancement, e.g., repetitions.

It is an object of embodiments herein to extend the support of multicast downlink transmission to wireless devices with limited bandwidth in a wireless communications network.

According to a first aspect of embodiments herein, the object is achieved by a method performed by a first network node. The first network node operates in a wireless communications network. The wireless communications network comprises a first group of wireless devices supporting transmission with a first bandwidth under a threshold and a second group of wireless devices supporting transmission with a second bandwidth over the threshold. The first network node configures a wireless device comprised in the first group of wireless devices. The wireless device has a first set of time-frequency resources to carry a first type of information between a second network node operating in the wireless communications network and the wireless device. The first network node configures the wireless device with at least one second set of time-frequency resources to carry a second type of information between the second network node and the wireless device. The second type of information is to be transmitted simultaneously to the first group of wireless devices. The first type of information is to be transmitted to at least one of: i) the first group of wireless devices and the second group of wireless devices, and ii) the wireless device. The first set of time-frequency resources and the at least one second set of time-frequency resources are in at least one of: a) different sets of frequencies and b) different transmission time periods.

According to a second aspect of embodiments herein, the object is achieved by a method performed by a wireless device. The wireless device operates in the wireless communications network. The wireless communications network comprises the first group of wireless devices supporting transmission with the first bandwidth under the threshold and the second group of wireless devices supporting transmission with the second bandwidth over the threshold. The wireless device is comprised in the first group of wireless devices. The wireless device receives a first configuration from the first network node operating in the wireless communications network. The wireless device has the first set of time-frequency resources to carry the first type of information between the second network node operating in the wireless communications network and the wireless device. The first configuration configures the wireless device with at least the second set of time-frequency resources to carry the second type of information between the second network node and the wireless device. The second type of information is to be transmitted simultaneously to the first group of wireless devices. The first type of information is to be transmitted to at least one of: i) the first group of wireless devices and the second group of wireless devices, and ii) the wireless device. The first set of time-frequency resources and the at least one second set of time-frequency resources are in at least one of: a) different sets of frequencies and b) different transmission time periods.

According to a third aspect of embodiments herein, the object is achieved by the first network node configured to operate in the wireless communications network. The wireless communications network comprises the first group of wireless devices configured to support transmission with the first bandwidth under the threshold and the second group of wireless devices configured to support transmission with the second bandwidth over the threshold. The first network node is further configured to configure the wireless device comprised in the first group of wireless devices. The wireless device is configured to have the first set of time-frequency resources to carry the first type of information between the second network node configured to operate in the wireless communications network and the wireless device. The first network node is further configured to configure the wireless device with at least the second set of time-frequency resources to carry the second type of information between the second network node and the wireless device. The second type of information is configured to be transmitted simultaneously to the first group of wireless devices. The first type of information is configured to be transmitted to at least one of: i) the first group of wireless devices and the second group of wireless devices, and ii) the wireless device. The first set of time-frequency resources and the at least one second set of time-frequency resources are configured to be in at least one of: a) different sets of frequencies and b) different transmission time periods.

According to a fourth aspect of embodiments herein, the object is achieved by the wireless device configured to operate in the wireless communications network. The wireless communications network comprises the first group of wireless devices configured to support transmission with the first bandwidth under the threshold and the second group of wireless devices configured to support transmission with the second bandwidth over the threshold. The wireless device is comprised in the first group of wireless devices. The wireless device is further configured to receive the first configuration from the first network node configured to operate in the wireless communications network. The wireless device is configured to have the first set of time-frequency resources to carry the first type of information between the second network node configured to operate in the wireless communications network and the wireless device. The first configuration is configured to configure the wireless device with at least the second set of time-frequency resources to carry the second type of information between the second network node and the wireless device 130. The second type of information is configured to be transmitted simultaneously to the first group of wireless devices. The first type of information is configured to be transmitted to at least one of: i) the first group of wireless devices and the second group of wireless devices, and ii) the wireless device. The first set of time-frequency resources and the at least one second set of time-frequency resources are configured to be in at least one of: a) different sets of frequencies and b) different transmission time periods.

According to a fifth aspect of embodiments herein, the object is achieved by a computer program. The computer program comprises instructions which, when executed on at least one processor, cause the at least one processor to carry out the method performed by the first network node.

According to a sixth aspect of embodiments herein, the object is achieved by computer-readable storage medium. The computer-readable storage medium has stored thereon a computer program comprising instructions which, when executed on at least one processor, cause the at least one processor to carry out the method performed by the first network node.

According to a seventh aspect of embodiments herein, the object is achieved by a computer program. The computer program comprises instructions which, when executed on at least one processor, cause the at least one processor to carry out the method performed by the wireless device.

According to an eighth aspect of embodiments herein, the object is achieved by computer-readable storage medium. The computer-readable storage medium has stored thereon a computer program comprising instructions which, when executed on at least one processor, cause the at least one processor to carry out the method performed by the wireless device.

By the first network node configuring the wireless device with at least the second set of time-frequency resources, more capacity is provided for transmitting the second type of information simultaneously to the first group of wireless devices with limited bandwidth, since the first type of information, e.g., NB-PSS/SSS, NB-PBCH and SIBs, is configured to be transmitted in the first set of time-frequency resources. Hence, transmission of the second type of information, e.g., multicast data, is enabled to the first group of wireless devices, e.g., devices with limited bandwidth, that would otherwise not be able to receive this type of information. This in turn results in savings in battery consumption, resource usage and time, when the intention is to transmit the same data to multiple wireless devices.

BRIEF DESCRIPTION OF THE DRAWINGS

Examples of embodiments herein are described in more detail with reference to the accompanying drawings, according to the following description.

DETAILED DESCRIPTION

Terminology

Figure 1:
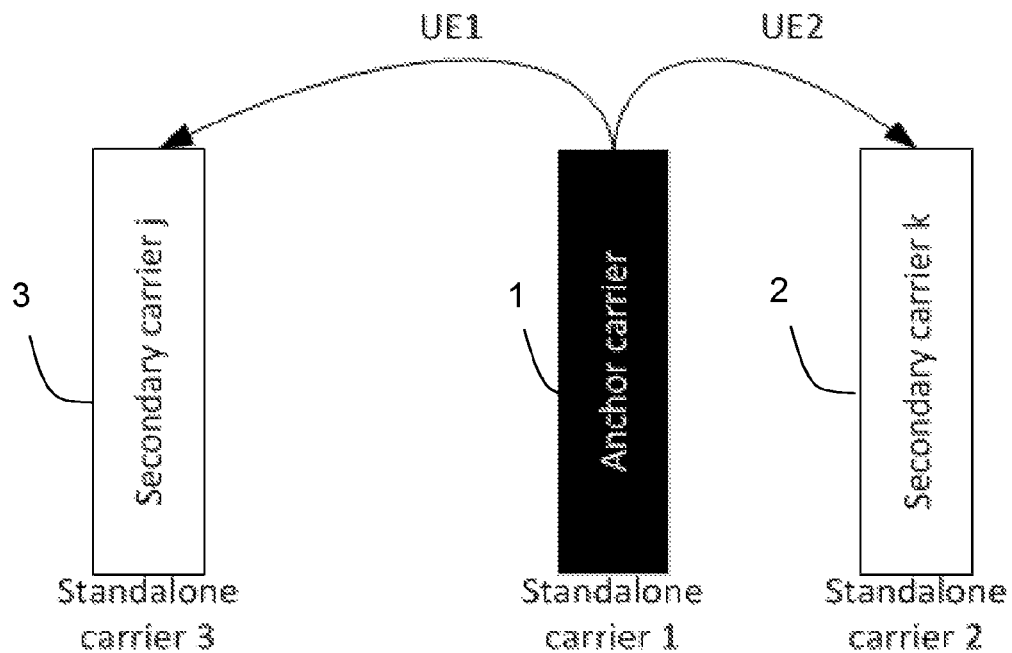
FIG. 1 is a schematic diagram illustrating an example of a multi-PRB configuration.
Figure 2:
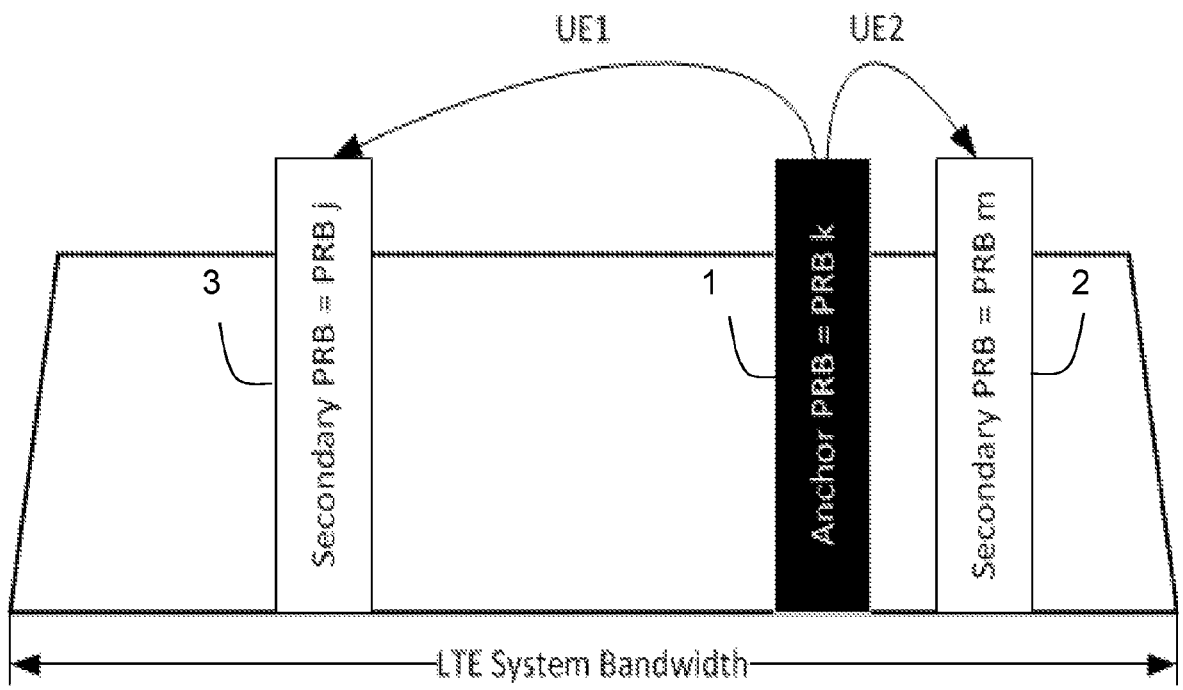
FIG. 2 is a schematic diagram illustrating another example of a multi-PRB configuration.
Figure 3:
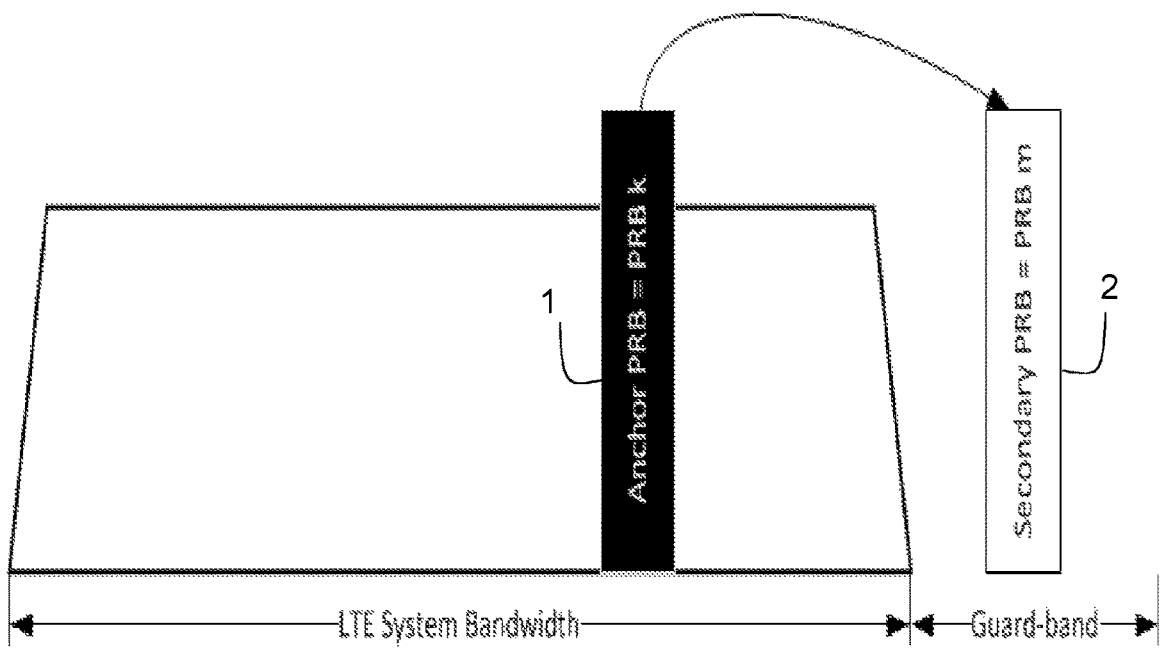
FIG. 3 is a schematic diagram illustrating another example of a multi-PRB configuration.
Figure 4:
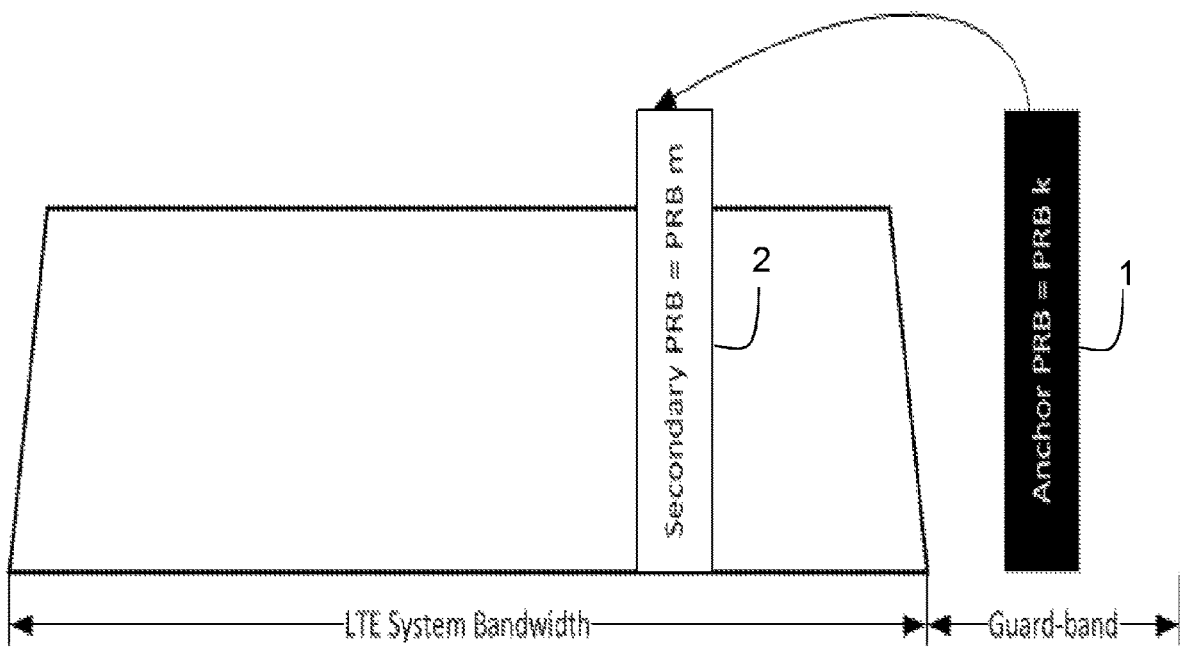
FIG. 4 is a schematic diagram illustrating another example of a multi-PRB configuration.

The following common terminology is used in the embodiments and are elaborated below:

The non-limiting term user equipment, a.k.a., UE, used herein may refer to any type of wireless device capable of communicating with a network node and/or with another UE in a cellular or mobile communication system, e.g., over radio signals. Examples of UE may also be radio communication device, target device, device to device (D2D) UE, machine type UE or UE capable of machine to machine (M2M) communication, a sensor equipped with UE, Personal Data Assistant (PDA), Ipad™, tablet computer, mobile terminals, smart phone, Laptop Embedded Equipped (LEE), Laptop Mounted Equipment (LME), Universal Serial Bus (USB) dongles, Customer Premises Equipment (CPE) etc.

The term "network node" used herein may refer to a radio network node or another network node, e.g., a core network node, Mobile Switching Centre (MSC), Mobility Management Entity (MME), Operational and Maintenance (O&M), Operational Support Systems (OSS), Self Organizing Network (SON) node, positioning node, e.g., Evolved Serving Mobile Location Centre (E-SMLC), location server, repeater, Minimization of Drive Test (MDT) node etc.

Also, in some embodiments, the term "radio network node" used herein may be any kind of network node comprised in e.g., a radio network, which may further comprise any of Base Station (BS), Radio Base Station (RBS), Base Transceiver Station (BTS), Base Station Controller (BSC), Radio Network Controller (RNC), evolved Node B (eNB or eNodeB), NodeB, Multi-Standard Radio (MSR) radio node such as MSR BS, relay node, donor node controlling relay, access point, radio Access Point (AP), transmission points, transmission nodes, Remote Radio Unit (RRU), Remote Radio Head (RRH), nodes in a Distributed Antenna System (DAS) etc.

The embodiments herein may also apply to the multi-point carrier aggregation systems.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from 3GPP LTE has been used in this disclosure to exemplify the embodiments herein, this should not be seen as limiting the scope of the embodiments herein to only the aforementioned system. Future radio access ("5G") will support similar or equivalent functionality. Hence, the terms used herein may need to be reinterpreted in view of possible terminology changes in future radio access technologies, such as 5G or earlier wireless systems. Similarly, other already existing wireless systems, including, Wideband Code Division Multiple Access (WCDMA), Worldwide Interoperability for Microwave Access (WMax), Ultra-Mobile Broadband (UMB) and Global System for Mobile communications (GSM), may also benefit from exploiting the ideas covered herein.

Figure 5:
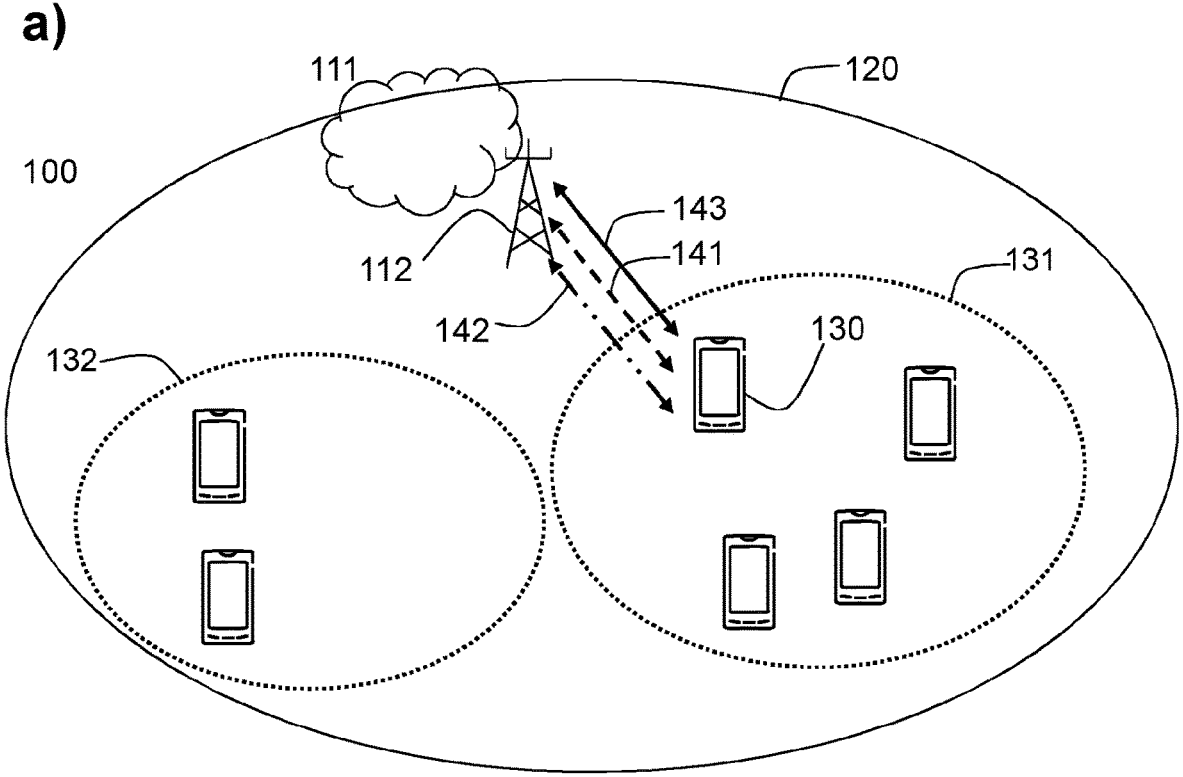
FIG. 5 shows in a) a schematic diagram illustrating a first example of a wireless communications network, according to embodiments herein, and in b) a schematic diagram illustrating a second example of a wireless communications network, according to embodiments herein.
Figure 5:
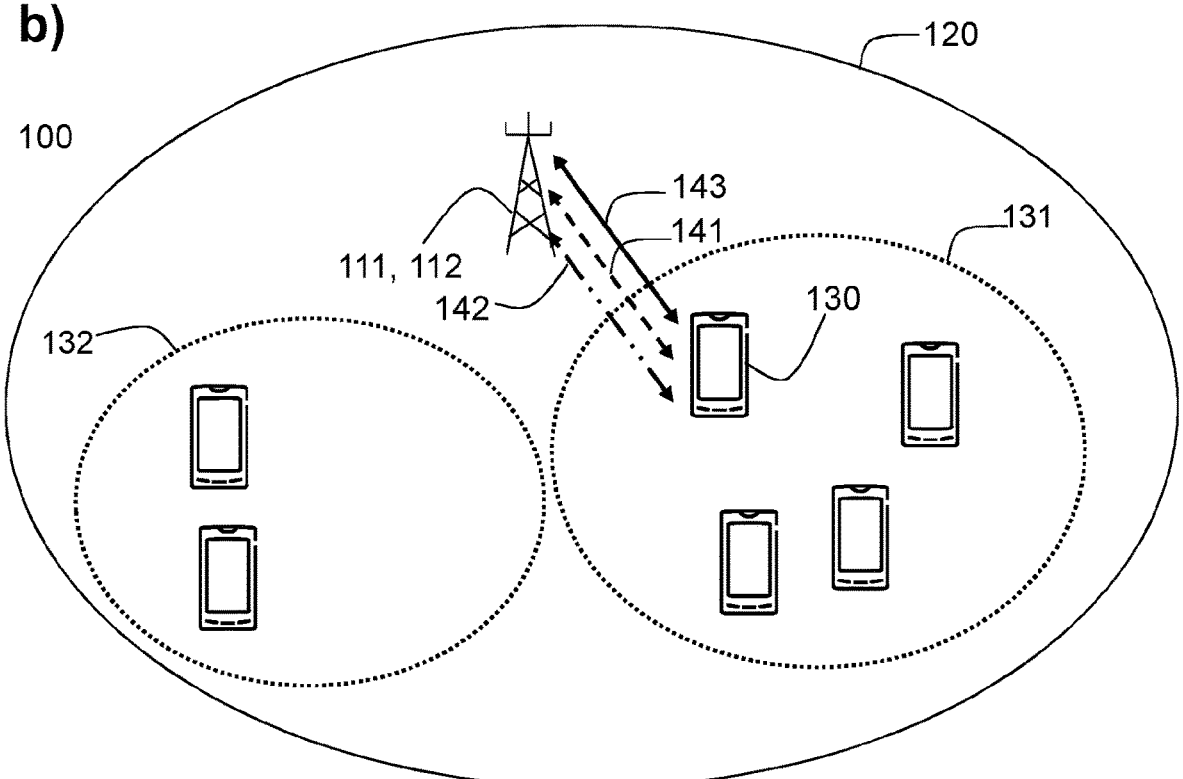

FIG. 5 depicts two non-limiting examples in FIG. 5*a*, and FIG. 5*b*, respectively, of a wireless communications network 100, sometimes also referred to as a cellular radio system, cellular network or wireless communications system, in which embodiments herein may be implemented. The wireless communications network 100 may for example be a network such as a Long-Term Evolution (LTE), e.g. LTE eMTC, NB-IoT, LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA)

TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system or any cellular network or system. Thus, although terminology from 3GPP LTE may be used in this disclosure to exemplify embodiments herein, this should not be seen as limiting the scope of the embodiments herein to only the aforementioned system.

The wireless communications network 100 comprises a plurality of network nodes wherein a first network node 111 and a second network node 112 are depicted in FIG. 5. Any of the first network node 111 and the second network node 112 may be a radio network node, such as a transmission point or a radio base station, for example an eNB, an eNodeB, or an Home Node B, an Home eNode B or any other network node capable to serve a wireless device, such as a user equipment or a machine type communication device in the wireless communications network 100. Any of the first network node 111 and the second network node 112 may be of different classes, such as, e.g., macro eNodeB, home eNodeB or pico base station, based on transmission power and thereby also cell size. In some embodiments, such as that depicted in FIG. 5a, the first network node 111 and the second network node 112 may be implemented as one or more distributed nodes, wherein the first network node 111 may be a virtual node in the cloud and the second network node 112 may be a radio network node. In other embodiments, such as that depicted in FIG. 5b, the first network node 111 and the second network node 112 may be the same network node.

In some particular embodiments, any of the first network node 111 and the second network node 112 may be a stationary relay node or a mobile relay node. The wireless communications network 100 covers a geographical area which is divided into cells, wherein each cell is served by a network node, although one network node may serve one or several cells. In the example depicted in FIG. 5, the second network node 112 serves a cell 120. Typically, the wireless communications network 100 may comprise more cells similar to the cell 120, served by their respective network nodes. This is not depicted in FIG. 5 for the sake of simplicity. In other examples than those depicted in FIG. 5, wherein the wireless communications network 100 is a non-cellular system, any of the first network node 111 and the second network node 112 may serve receiving nodes with serving beams. Any of the first network node 111 and the second network node 112 may support one or several communication technologies, and their name may depend on the technology and terminology used. Any of the first network node 111 and the second network node 112 may be directly connected to one or more core networks.

A plurality of wireless devices are located in the wireless communications network 100, of which only a few are represented in FIG. 5 for illustrative purposes. The number of wireless devices represented in FIG. 5 is non-limiting. In the example scenario of FIG. 5, the wireless communications network 100 comprises a first wireless device 130, which is also referred to herein as the wireless device 130. The wireless device 130 is comprised in a first group of wireless devices 131 operating in the wireless communications network 100. The wireless communications network 100 also comprises a second group of wireless devices 132. Each of the wireless devices in the first group of wireless devices 131 and the second group of wireless devices 132 is a wireless communication device such as a UE which is also known as e.g. mobile terminal, wireless terminal and/or mobile station, a mobile telephone, cellular telephone, or laptop with wireless capability, just to mention some further examples. Each of the wireless devices in the first group of wireless devices 131 and the second group of wireless devices 132 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device, modems, or any other radio network unit capable of communicating over a radio link in a cellular communications system. Each of the wireless devices in the first group of wireless devices 131 and the second group of wireless devices 132 is wireless, i.e., it is enabled to communicate wirelessly in the wireless communication network 100, sometimes also referred to as a cellular radio system or cellular network. The communication may be performed e.g., between two devices, between a device and a regular telephone and/or between a device and a server. The communication may be performed e.g., via a RAN and possibly one or more core networks, comprised within the wireless communications network 100.

Particular embodiments of wireless devices, such as each of the wireless devices in the first group of wireless devices 131 and the second group of wireless devices 132, that may be served by such a system include Machine Type Communication (MTC) devices such as sensors, and any type of UEs using coverage enhancements.

The first group of wireless devices 131 support transmission with a first bandwidth under a threshold and the second group of wireless devices 132 support transmission with a second bandwidth over the threshold. For example, the first group of wireless devices 131 may be Cat-NB1 UEs, Cat-M1 UEs, limited bandwidth wireless devices, or narrowband wireless devices. As a non-limiting particular example, the threshold, a bandwidth value, may be 6 PRBs, for e.g., Cat-M1 UEs, and 1 PRB for, e.g., Cat-NB1 UEs.

The wireless device 130 may communicate with any of the first network node 111 and the second network node 112 over any of a first link 141, a second link 142 and a third link 143, although the wireless device 130 may communicate with any of the first network node 111 and the second network node 112 over more links. Each of the first link 131, the second link 142 and the third link 143 may be, e.g., a radio link. Each of the wireless devices in the first group of wireless devices 131 and the second group of wireless devices 132 may communicate with any of the first network node 111 and the second network node 112 over a respective radio link, which is not illustrated to simplify FIG. 5.

Several embodiments are comprised herein. More specifically, the following are embodiments related to a first network node, such as the first network node 111, and to a wireless device, such as the wireless device 130.

Figure 6:
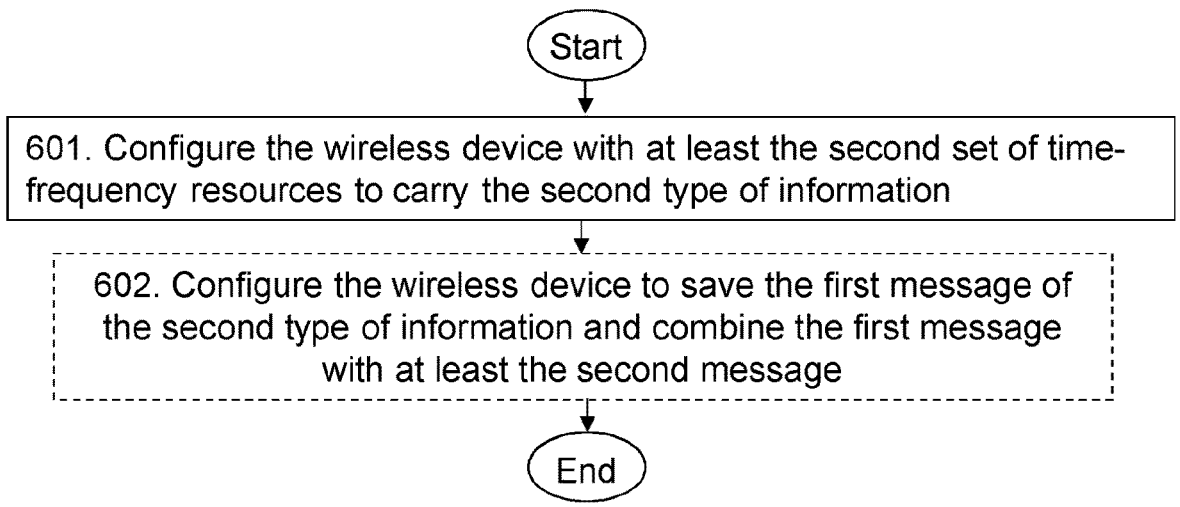
FIG. 6 shows in a) a flowchart illustrating a first example of embodiments of a method in a first network node, according to embodiments herein, and in b) a flowchart illustrating a second example of embodiments of a method in a first network node, according to embodiments herein.
Figure 6:
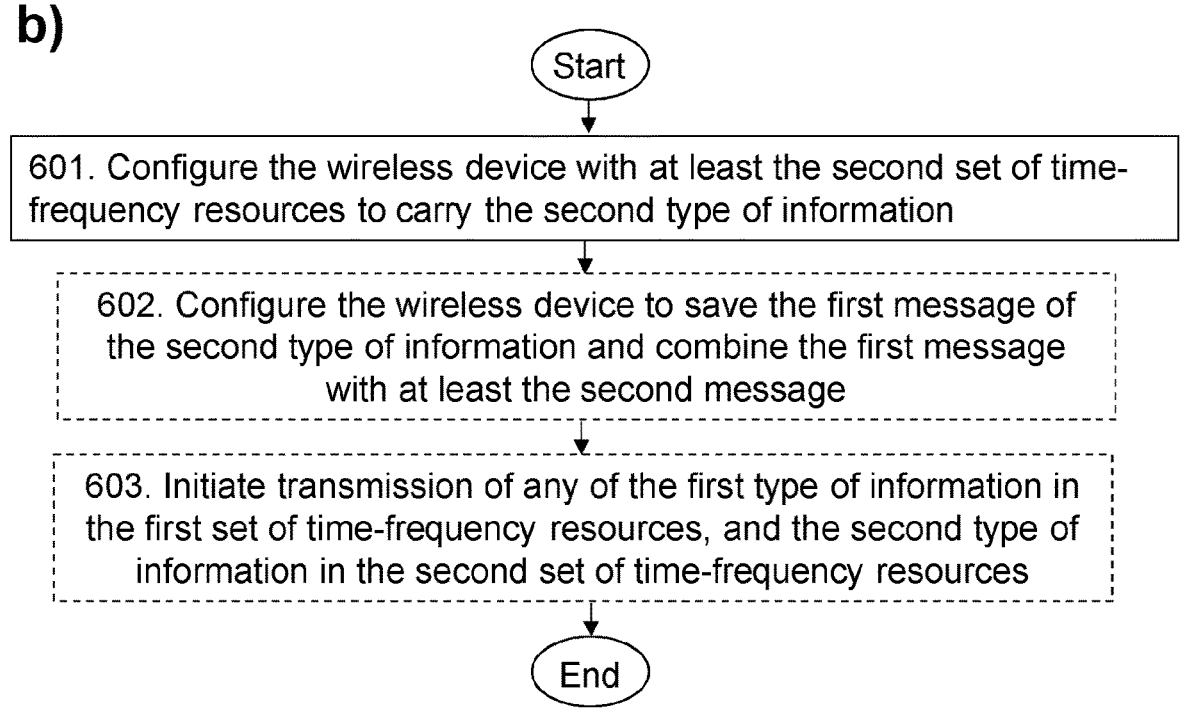

Embodiments of a method performed by the first network node 111 operating in the wireless communications network 100, will now be described with reference to the flowcharts depicted in FIG. 6. The wireless communications network 100 comprises the first group of wireless devices 131 supporting transmission with a first bandwidth under a threshold and the second group of wireless devices 132 supporting transmission with a second bandwidth over the threshold. As stated earlier, in some examples, the first group of wireless devices 131 may operate in the wireless communications network 100 with Machine-Type Communication, MTC, that is, they may use MTC or communicate with MTC in the wireless communications network 100. In some examples, the wireless devices in the first group of wireless devices 131 may operate with NB-IoT.

In some examples, the threshold may be 1 PRB, e.g., when the wireless devices in the first group of wireless devices 131 may operate with NB-IoT, and 6 PRB, e.g., when the wireless devices in first group of wireless devices 131 may operate with eMTC, that is, they may be Cat-M1 UEs. It may be understood herein that the distinction between the first group of wireless devices 131 and the second group of wireless devices 132 is made herein to explain that the expression "limited bandwidth" for wireless devices is relative to other wireless devices not having such a considered limitation. Therefore, it may be understood that in some particular examples of the wireless communications network 100, the second group of wireless devices 132 supporting transmission with a second bandwidth over the threshold may comprise no wireless devices.

The method may comprise one or more of the following actions. In particular, the method comprises Action 601. In some embodiments all the actions may be performed. One or more embodiments may be combined, where applicable. All possible combinations are not described to simplify the description. FIG. 6a, and FIG. 6b depict, respectively, a non-limiting example of the method performed by the first network node 111. In FIG. 6a, and FIG. 6b, optional actions are indicated by dashed boxes. FIG. 6a shows a non-limiting example of the method, wherein the first network node 111 performs Action 601 and Action 602. FIG. 6b shows another non-limiting example of the method, wherein the first network node 111 performs Action 601, Action 602, and Action 603.

Action 601

In order to enable multicast services in wireless devices with limited or reduced bandwidth, such as those comprised in the first group of wireless devices 131, the first network node 111 may take advantage of multi-carrier operation. In the following text, "multicast" is used as a general term that refers to all kinds of single-point to multi-point services, including but not limited to broadcast, SC-PtM, MBSFN, etc.

In this Action 601, the first network node 111 configures a wireless device, such as the wireless device 130, comprised in the first group of wireless devices 131. The wireless device 130 has a first set of time-frequency resources, e.g., a carrier, to carry a first type of information between the second network node 112 operating in the wireless communications network 100 and the wireless device 130. The first type of information is to be transmitted to at least one of: i) the first group of wireless devices 131 and the second group of wireless devices 132, e.g., broadcasted by the second network node 112 nonspecifically, such as system information, and ii) the wireless device 130, e.g., unicasted or transmitted by the second network node 112 in a point-to-point way. The first network node 111, according to this Action 601, configures the wireless device 130 with at least a second set of time-frequency resources to carry a second type of information between the second network node 112 and the wireless device 130. A second set of time-frequency resources may be understood as one second set of time-frequency resources. The second type of information is to be transmitted simultaneously to the first group of wireless devices 131, e.g., multicasted to the first group of wireless devices 131 by the second network node 112. According to the foregoing, the first type of information and the second type of information may be understood to differ in to whom they are targeted, in other words, to which devices they are addressed.

The first set of time-frequency resources and the at least one second set of time-frequency resources are in at least one of: a) different sets of frequencies—a particular example of this is described below in Scenario 1—and b) different transmission time periods—a particular example of this is described below in Scenario 6.

By the first network node 111 configuring the wireless device 130 with at least the second set of time-frequency resources, more capacity is provided for transmitting the second type of information simultaneously to the first group of wireless devices 131 with limited bandwidth, since the first type of information is configured to be transmitted in the first set of time-frequency resources.

The first set of time-frequency resources may be on a first set of frequencies, e.g., a first carrier, and the second set of time-frequency resources may be on a second set of frequencies, e.g., a second carrier, wherein the first set of frequencies may be different and/or disjoint from the second set of frequencies. A particular example of this is described below in Scenario 1.

The first set of time-frequency resources may be in an anchor carrier, and the at least one second set of time-frequency resources may be one or more secondary carriers.

In some examples, the first set of time-frequency resources may be on a first Physical Resource Block, PRB, and the second set of time-frequency resources may be on at least a second PRB, that is one second PRB, wherein the first PRB may be different and/or disjoint from the second PRB. The PRBs may be defined in agreement with a segmentation configured in the wireless communications network 100.

In some examples, the second type of information may be based on a broadcast or multicast service, e.g., a Multimedia Broadcast Multicast Service. The second type of information may also be referred to herein as "multicast", "multicast information", or "multicast data". For example, the second type of information may be multicast information of a particular multicast session. The second type of information may also be multicast information from an external source or content provider, that is, the multicast data may be coming outside of the core network of the wireless communications network 100, in comparison to e.g., broadcasted information which may be specific to the wireless communications network 100 and comes from the wireless communications network 100.

In some examples, the second type of information may be transmitted with at least one of: Multicast-Broadcast Single Frequency Network, MBSFN, and Single Cell Point-to-Multipoint, SC-PtM.

According to the foregoing, in some particular examples, wherein the first group of wireless devices 131 may operate in the wireless communications network 100 with one of: Machine-type Communication, MTC, and Narrow Band-Internet of Things, NB-IoT, a) the second type of information may be based on a Broadcast Multicast Service, and b) the second type of information may be transmitted with at least one of: Multicast-Broadcast Single Frequency Network, MBSFN, and Single Cell Point-to-Multipoint, SC-PtM.

The configuring in this action 601 may also comprise configuring the wireless device 130 with the first set of time-frequency resources to carry the first type of information between the second network node 112 and the wireless device 130.

Configuring may comprise, e.g. sending a first indication regarding the at least one second set of time-frequency resources. Configuring may be understood to further comprise sending a second indication regarding the first set of time-frequency resources. The configuring in this Action 601 may be understood as sending a first configuration.

This may be done, e.g., via a downlink control channel or via system information, or via Radio Resource Control (RRC) configuration or other similar ways.

The multicast services may be realized using two different transmissions schemes, MBMS Single-Frequency Network (MBSFN) and Single-Cell Point-to-Multipoint (SC-PTM).

In SC-PtM, part of the configuration and control information may be sent over a Single-Cell Multicast Control Channel (SC-MCCH) logical channel [4]. UEs are not expected to monitor this channel continuously, but an indication of change to this information may be indicated using a Single-Cell Notification Radio Network Temporary Identifier (SC-N-RNTI), which UEs may be expected to monitor [3].

Likewise, for MBSFN, part of the configuration and control information may be sent over a Multicast Control Channel (MCCH). Changes may be indicated using MBMS-Radio Network Temporary Identifier (RNTI) in this case.

The configuring in this Action 601 may be further based on a determination of a category of the wireless device 130, an indication of which may be received from the wireless device 130. The category may indicate that the wireless device 130 supports transmission with the first bandwidth under the threshold, e.g., a limited bandwidth.

Since different carriers, or PRBs, may have different coverage levels, the wireless devices in the first group of wireless devices 131 with different coverage levels may be served by different secondary carriers, or PRBs. Therefore, the wireless devices in the first group of wireless devices 131 may be grouped based on their coverage levels, and the ones requiring similar number of repetitions may be grouped together.

Accordingly, the configuring 601 may be further based on at least one of: a) a coverage level of the wireless device 130, b) one or more coverage levels of the first group of wireless devices 131, c) a number of wireless devices comprised in the first group of wireless devices 131, d) a service type, e.g., MTC service as described earlier, of the second type of information, and e) whether the second type of information comprises data or control information. A particular example of options a) and b) is described below in Scenarios 1-4, a particular example of option d) is described in below in Scenario 9, and a particular example of option e) is described below in Scenario 8.

Accordingly, in some embodiments, at least one of the following may apply. In one embodiment, the coverage level of the wireless device 130 may be a number of repetitions that may be required by the wireless device 130; in other words, the coverage level of the wireless device 130 may be the number of repetitions used by a physical channel for the network to reach the wireless device 130. In another embodiment, the one or more coverage levels of the first group of wireless devices 131 may be a number of repetitions that may be required by the first group of wireless devices 131; in other words, the coverage level of the wireless device 130 may be the number of repetitions used by a physical channel for the network to reach the first group of wireless devices 131.

The second set of frequencies may comprise at least a first subset of frequencies and a second subset of frequencies, wherein each of the first subset of frequencies and the second subset of frequencies may be configured to transmit to different subgroups of wireless devices within the first group of wireless devices 131, based on a coverage level of the wireless devices within each of the subgroups. A particular example of this is described below in Scenario 2.

In some examples, the second set of frequencies may comprise at least a first subset of frequencies and a second subset of frequencies, wherein each of the first subset of frequencies and the second subset of frequencies may be configured to transmit to different subgroups of wireless devices within the first group of wireless devices 131, based on a service type of the second type of information to be transmitted to the wireless devices within each of the subgroups. A particular example of this is described below in Scenario 9. By using different e.g., secondary PRBs, for different services, the requirements of each of the services may be handled separately.

In some examples, the second set of time-frequency resources on the second set of frequencies may be configured to carry information transmitted to different subgroups of wireless devices within the first group of wireless devices 131, at different time periods, based on a coverage level of the wireless devices within each of the subgroups. A particular example of this is described below in Scenario 3.

In some examples, the configuring 601 may further comprise configuring the wireless device 130 with a third set of time-frequency resources on a third set of frequencies, wherein the third set of time-frequency resources may be configured to carry retransmissions of the second type of information to the wireless device 130. A particular example of this is described below in Scenario 10. If the wireless device 130 fails to decode the initial transmission, possibly consisting of multiple repetitions for coverage enhancement, it may tune in to e.g., the PRB configured to handle retransmissions to try and to acquire the missed transmission.

Each of the first set of time-frequency resources and the second set of time-frequency resources may be on one of: a) a first set of frequencies and b) a second set of frequencies, based on a time when they are transmitted. This may be understood as frequency-hopping, used as another way to increase capacity for enabling transmission of the second type of information. A particular example of this is described below in Scenario 7.

In some examples, any of the wireless devices comprised in the first group of wireless devices 131 may send a random access preamble signal to the first network node 111, wherein the random access preamble signal may comprise multiple symbol groups, with each symbol group on a frequency resource during a different time resource. In such examples, the configuring in this action 601 may be further based on the first network node 111 detecting such a random access preamble signal, e.g., based on the duration of each symbol group. The frequency resource may be a single physical resource block (PRB). The detection may include blind detection.

Action 602

In some examples, the wireless device 130 may have a coverage level under a coverage threshold. In instances when there may be only a few wireless devices in the first group of wireless devices 131 with relatively poor coverage may need to be served, it may not be economical to just configure the second set of time-frequency resources to serve a few wireless devices in the first group of wireless devices 131 in bad coverage. In such examples, the method may further comprise Action 602. According to this action the first group of wireless devices 131 with relatively poor coverage may save e.g., a multi-cast message, and combine it with the rest of the message which may be sent to them in a point-to-point way. Hence, according to Action 602, the first network node 111 may configure the wireless device 130 to save a first message of the second type of information received on the second set of frequencies, and combine the first message with at least a second message transmitted solely to the wireless device 130. A particular example of this is described below in Scenario 4.

The configuring in this Action 601 may be understood as sending a second configuration.

The first type of information may provide an indication to the wireless device 130 about the second type of information being transmitted in the second set of time-frequency resources. A particular example of this is described below in Scenario 5.

Action 603

Once the first network node 111 may have configured the wireless device 130, it may enable the transmission of any of the first type of information on the first set of time-frequency resources. In some embodiments, the method may further comprise the following action 603. According to Action 603, the first network node 111 may initiate transmission of any of the first type of information on the first set of time-frequency resources and the second type of information on the at least one second set of time-frequency resources. Initiating transmission may comprise triggering transmission or transmitting, e.g., sending. Transmission may be via e.g., any of the first link 141, the second link 142, and the third link 143.

EXAMPLES OF EMBODIMENTS HEREIN

Some particular examples of embodiments herein will be described next, as different scenarios.

In the following description, NB-IoT devices are used for illustrative purposes. Any reference to a/the UE of a/the NB-IoT device is understood to equally refer to the wireless device 130, any reference to a/the network node is understood to refer to the first network node 111 and/or the second network node 112, as appropriate according to the examples herein, and any reference herein to NB-IoT devices is understood to refer to the first group of wireless devices 131.

In NB-IoT systems, several secondary PRBs may be configured. In FIGS. 1 to 4, several non-limiting examples of multi-PRB operation configurations in NB-IoT systems have been illustrated.

Different carriers may have different output power, and therefore have different coverages. Usually, the anchor carrier, or PRB, may have higher output power than other carriers, or PRBs, and may be used to serve the NB-IoT devices in all coverage levels. The secondary carrier, or PRB, with lower output power may be used to serve the NB-IoT devices in good coverage.

As an additional alternative aspect, when Cat-M1, that is, eMTC, UEs may be used, the scenarios listed below may be applied as well. For eMTC, the bandwidth may be limited to 6 PRBs, that is, 6 times 180 kHz, which may constitute one narrowband in an eMTC, or LTE, system. Multiple narrowbands may be configured, and the UE may retune the receiver and transmitter between the narrowbands as necessary. For eMTC, one of the narrowbands may be configured as the "anchor narrowband" in similar fashion as for a NB-IoT anchor PRB.

The following scenarios represent non-limiting examples of embodiments herein.

Scenario 1

One of the configurations may be to use one secondary PRB in the NB-IoT systems for multicast services. In this configuration, the NB-IoT devices that may need to be served by a multicast service may be directed to one secondary PRB. This may be done, e.g., via a downlink control channel or via system information, or via Radio Resource Control (RRC) configuration or other similar ways. This secondary PRB may then be configured according to the worst coverage NB-IoT device(s) in the group that may need to be served.

Scenario 2

This is an extension of scenario 1. In this case, several secondary PRBs may be configured in the NB-IoT systems for multicast services, although it may not be at the same time. Since different carriers, or PRBs, may have different coverage levels, the NB-IoT devices with different coverage levels may be served by different secondary carriers, or PRBs. Therefore, the NB-IoT devices may be grouped based on their coverage levels, and the ones requiring similar number of repetitions and Modulation Coding Scheme (MCS) may be grouped together. Then, different groups of NB-IoT devices may be configured on different secondary PRBs, although it may not be necessary at the same time.

Scenario 3

This scenario is similar to scenario 2, but using a time domain approach. In this case, the NB-IoT devices with similar coverage may be configured on the same secondary PRB, but at different times. The benefit of doing so is that the NB-IoT device may wake up when it may need to listen to the multicast data, and when finished, it may go back to idle or deep sleep mode immediately.

Scenario 4

Another approach, according to embodiments herein, may be to design the multi-cast message in a way that the good coverage NB-IoT devices may decode it, and the NB-IoT devices with relatively poor coverage may save the multicast message and combine it with the rest of the message sent to them in a point-to-point way.

This scenario may apply, for example in instances when only a few NB-IoT devices with relatively poor coverage may need to be served. It may not be economical to just configure a secondary multicast PRB or carrier to serve a few NB-IoT devices in bad coverage. Therefore, there may be two approaches. The first approach may be to simply serve these NB-IoT devices in a regular way, i.e., point-to-point. The second approach may be that described in this scenario.

One example design of this scenario is similar to the Narrowband Physical Broadcast CHannel (NPBCH) design in the NB-IoT system, see [2] and references therein for details, in that the message may be encoded into several self-decodable blocks, and these blocks may be transmitted independently and combined at the end to be used to decode the message.

Scenario 5

In this scenario, the multi-cast service may be conducted in a similar way as SC-PtM. The NB-IoT devices may receive the Downlink Control Information (DCI) in the anchor carrier, and the Downlink Control Information may redirect the multi-cast UEs to a secondary carrier, e.g., a PRB. The Downlink Control Information may be either in a common search space, or in a UE specific search space. Upon receiving the Downlink Control Information, the multi-cast UE may accordingly listen to the secondary carrier, or PRB, for the multi-cast message.

Scenario 6

In this scenario, the multi-cast service may be configured in the time domain at the anchor PRB or carrier. That is, at a given time, the DL traffic from the eNB or BS may be a multi-cast message. The NB-IoT devices may be configured to listen to the multi-cast message through, e.g., via downlink control channel or via system information, or via RRC configuration or other similar ways. In one example, the SC-PtM logical channel SC-MCCH may be used to convey the configuration information, in legacy SC-PtM, SC-MCCH may be used to carry the SCPTM Configuration RRC message [3], which may include, e.g., the scheduling periodicity of the multicast traffic.

This scenario may be preferably applied, e.g., if it is not possible to configure a secondary PRB or carrier in the system.

Scenario 7

In this scenario, frequency hopping may be used between the anchor and secondary PRBs or carriers. In order to exploit the benefit of frequency diversity, it may also be beneficial to have the possibility to have frequency hopping. The hopping may be configured among anchor and secondary PRBs or carriers, or only among the secondary PRBs or carriers. The hopping may be done either in a predetermined way, e.g., cell/service specific, or base on the availability of the resources.

Scenario 8

In one alternative, the physical transmissions of logical channels used by SC-PtM, Single-Cell Multicast Control Channel (SC-MCCH) for control information and Single-Cell Multicast Traffic Channel (SC-MTCH) for data transmission, may be sent in different carriers. One transmission of either SC-MCCH or SC-MTCH may consist of both, the DCI transmission on NPDCCH, or MPDCCH, and the data transmission on Narrowband Physical Downlink Shared Channel (NPDSCH) or Physical Downlink Shared Channel (PDSCH). In one embodiment, the SC-MCCH transmission may be scheduled on an anchor carrier, and the SC-MTCH transmission on a secondary carrier or PRB.

It may be also possible to combine this scenario with Scenario 5, where for example the DCI of the SC-MCCH transmission may be sent on the anchor carrier and further transmissions, such as the SC-MCCH content and SC-MTCH DCI and multicast data, may be sent on a secondary carrier or PRB.

Scenario 9

Multicast services may have separate requirements on reliability, latency etc. . . . . . By using different secondary PRBs for different services, the requirements may be handled separately, e.g., by relying on that the different secondary PRBs may have different coverage levels.

Scenario 10

In one embodiment, if the multicast is configured with retransmissions, one or several secondary PRBs may be configured to handle retransmissions. If a UE fails to decode the initial transmission, possibly consisting of multiple repetitions for coverage enhancement, it may tune in to the PRB configured to handle retransmissions to try and to acquire the missed transmission. These retransmissions may be configured to be sent after each initial transmission, or they may be triggered by feedback from UEs.

Figure 7:
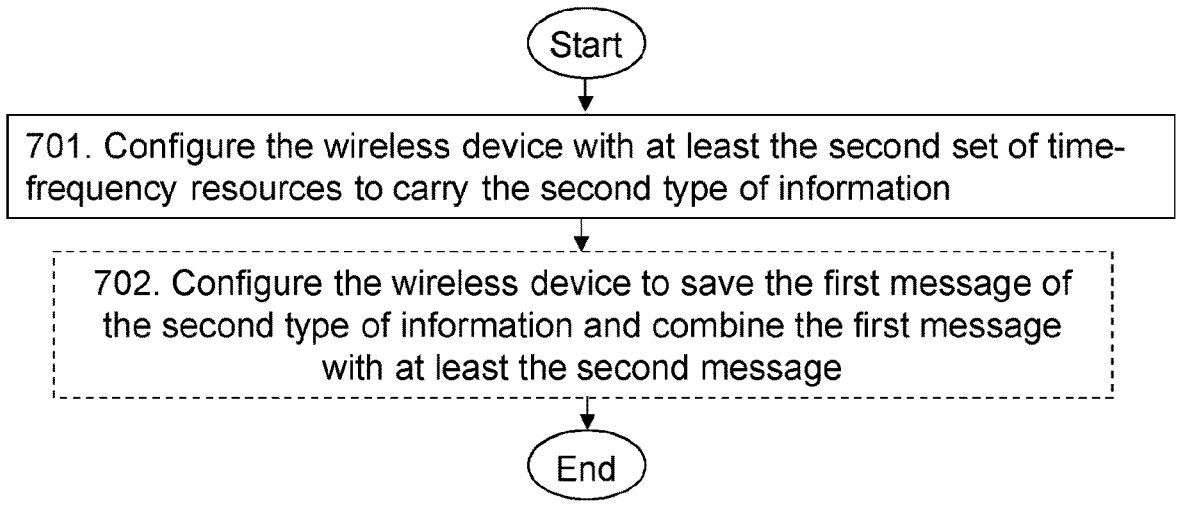
FIG. 7 shows in a) a flowchart illustrating a first example of embodiments of a method in a wireless device, according to embodiments herein, and in b) a flowchart illustrating a second example of embodiments of a method in a wireless device, according to embodiments herein.
Figure 7:
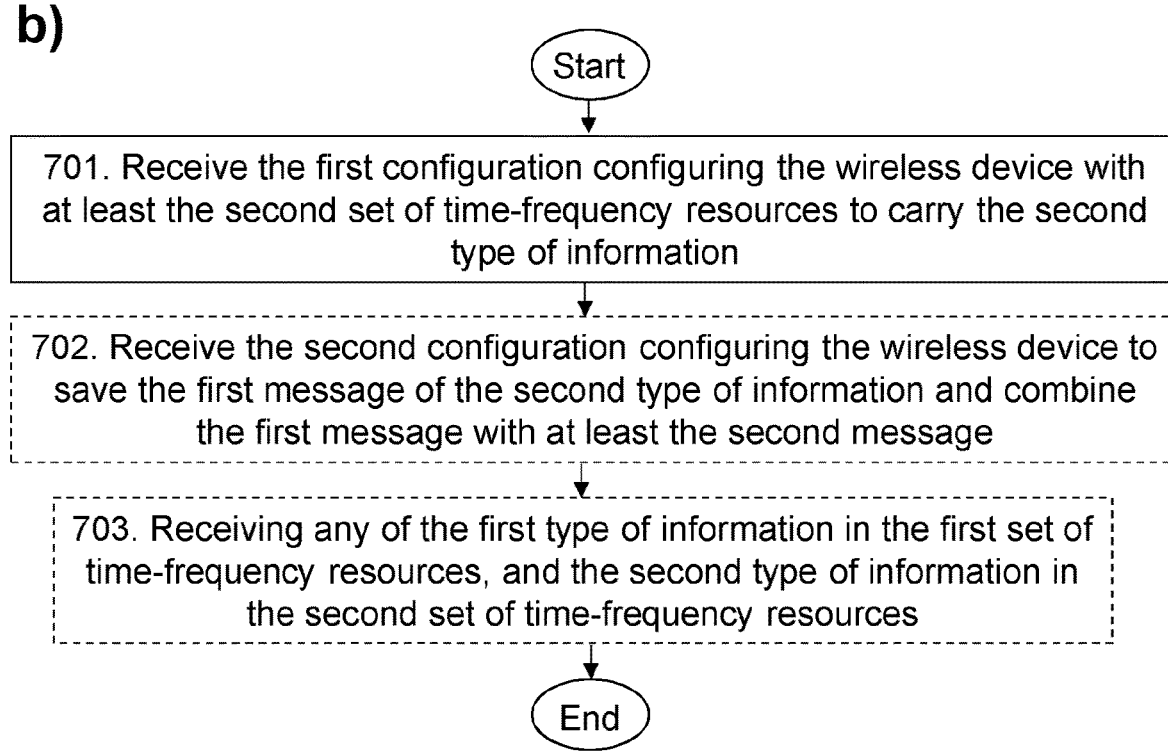

Embodiments of a method performed by the wireless device 130 operating in the wireless communications network 100, will now be described with reference to the flowcharts depicted in FIG. 7. The wireless communications network 100 comprises the first group of wireless devices 131 supporting transmission with the first bandwidth under the threshold and the second group of wireless devices 132 supporting transmission with the second bandwidth over the threshold. The wireless device 130 is comprised in the first group of wireless devices 131.

The detailed description of some of the following corresponds to the same references provided above, in relation to the actions described for the first network node 111, and will thus not be repeated here to simplify the description. For example, as stated earlier, in some examples, the first group of wireless devices 131 may operate in the wireless communications network 100 with MTC or with NB-IoT.

It should be noted that the examples herein are not mutually exclusive. Components from one example may be tacitly assumed to be present in another example and it will be obvious to a person skilled in the art how those components may be used in the other examples.

The method may comprise one of more of the following actions. In particular, the method comprises Action 701. In some embodiments all the actions may be performed. One or more embodiments may be combined, where applicable. All possible combinations are not described to simplify the description. FIG. 7a, and FIG. 7b depict, respectively, a non-limiting example of the method performed by the wireless device 130. In FIG. 7a, and FIG. 7b, optional actions are indicated by dashed boxes. FIG. 7a shows a non-limiting example of the method, wherein the wireless device 130 performs Action 701 and Action 702. FIG. 7b shows another non-limiting example of the method, wherein the wireless device 130 performs Action 701, Action 702, and Action 703. Further differences between the example of FIGS. 7a, and that of FIG. 7b are explained below.

Action 701

In order to enable multicast services in wireless devices with limited or reduced bandwidth, such as those comprised in the first group of wireless devices 131, the wireless device 130 may take advantage of multi-carrier operation. In this Action 701, as shown in the example of FIG. 7b, the wireless device 130 receives the first configuration from the first network node 111 operating in the wireless communications network 100. The wireless device 130 has the first set of time-frequency resources to carry the first type of information between the second network node 112 operating in the wireless communications network 100 and the wireless device 130. The first configuration configures the wireless device 130 with at least the second set of time-frequency resources to carry the second type of information between the second network node 112 and the wireless device 130. The second type of information is to be transmitted simultaneously to the first group of wireless devices 131. The first type of information is to be transmitted to at least one of: i) the first group of wireless devices 131 and the second group of wireless devices 132, and ii) the wireless device 130. The first set of time-frequency resources and the at least one second set of time-frequency resources are in at least one of: a) different sets of frequencies and b) different transmission time periods.

Receiving the first configuration in this Action 701, as shown in the non-limiting example of FIG. 7b, may be understood as the wireless device 130 implementing the first configuration, that is, configuring itself according to the first configuration received from the first network node 111, as shown in the non-limiting example of FIG. 7a.

By the wireless device 130 receiving the first configuration configuring the wireless device 130 with at least the second set of time-frequency resources, more capacity is provided for receiving the second type of information simultaneously by the first group of wireless devices 131 with limited bandwidth, including the wireless device 130, since the first type of information is configured to be carried in the first set of time-frequency resources.

The first set of time-frequency resources may be on the first set of frequencies and the second set of time-frequency resources are on the second set of frequencies, wherein the first set of frequencies may be different and/or disjoint from the second set of frequencies. A particular example of this is described above in Scenario 1.

In some examples, the first set of time-frequency resources may be in the anchor carrier, and the at least one second set of time-frequency resources may be on one or more secondary carriers.

The first set of time-frequency resources may be on the first PRB, and the second set of time-frequency resources may be on at least the second PRB, wherein the first PRB may be different and/or disjoint from the second PRB.

In some examples, the second type of information may be based on a broadcast or multicast service, e.g., a Multimedia Broadcast Multicast Service.

In some examples, the second type of information may be transmitted with at least one of: Multicast-Broadcast Single Frequency Network, MBSFN, and Single Cell Point-to-Multipoint, SC-PtM According to the foregoing, in some particular examples, wherein the first group of wireless devices 131 may operate in the wireless communications network 100 with one of: Machine-type Communication, MTC, and Narrow Band-Internet of Things, NB-IoT, a) the second type of information may be based on a Broadcast Multicast Service, and b) the second type of information may be transmitted with at least one of: Multicast-Broadcast Single Frequency Network, MBSFN, and Single Cell Point-to-Multipoint, SC-PtM.

The first configuration may also configure the wireless device 130 with the first set of time-frequency resources to carry the first type of information between the second network node 112 and the wireless device 130.

The receiving in this action 701 may be further based on the category of the wireless device 130, the indication of which may be sent by the wireless device 130 to the first network node 111. The category may indicate that the wireless device 130 supports transmission with the first bandwidth under the threshold, e.g., a limited bandwidth.

The first configuration may be further based on at least one of: a) the coverage level of the wireless device 130, b) one or more coverage levels of the first group of wireless devices 131, c) the number of wireless devices comprised in the first group of wireless devices 131, d) the service type of the second type of information, and e) whether the second type of information comprises data or control information. A particular example of options a) and b) is described above in Scenarios 1-4, a particular example of option d) is described in above in Scenario 9, and a particular example of option e) is described above in Scenario 8.

As explained earlier, the coverage level of the wireless device 130 may be the number of repetitions that may be required by the wireless device 130. The one or more coverage levels of the first group of wireless devices 131 may be the number of repetitions that may be required by the first group of wireless devices 131.

In some examples, the second set of frequencies may comprise at least the first subset of frequencies and the second subset of frequencies, wherein each of the first subset of frequencies and the second subset of frequencies may be configured to transmit to different subgroups of wireless devices within the first group of wireless devices 131, based on a coverage level of the wireless devices within each of the subgroups. A particular example of this is described above in Scenario 2.

In other examples, the second set of frequencies may comprise at least the first subset of frequencies and the second subset of frequencies, and wherein each of the first subset of frequencies and the second subset of frequencies may be configured to transmit to different subgroups of wireless devices within the first group of wireless devices 131, based on the service type of the second type of information to be transmitted to the wireless devices within each of the subgroups. A particular example of this is described above in Scenario 9. By using different e.g., secondary PRBs, for different services, the requirements of each of the services may be handled separately.

The second set of time-frequency resources on the second set of frequencies may be configured to carry information transmitted to different subgroups of wireless devices within the first group of wireless devices 131, at different time periods, based on the coverage level of the wireless devices within each of the subgroups. A particular example of this is described above in Scenario 3.

In some examples, the first configuration may further configure the wireless device 130 with a third set of time-frequency resources on a third set of frequencies, wherein the third set of time-frequency resources may be configured to carry retransmissions of the second type of information to the wireless device 130. A particular example of this is described above in Scenario 10. If the wireless device 130 fails to decode the initial transmission, possibly consisting of multiple repetitions for coverage enhancement, it may tune in to e.g., the PRB configured to handle retransmissions to try and to acquire the missed transmission.

Each of the first set of time-frequency resources and the second set of time-frequency resources may be on one of: a) the first set of frequencies and b) the second set of frequencies, based on the time when they are transmitted. This may be understood as frequency-hopping, used as another way to increase capacity for enabling transmission of the second type of information. A particular example of this is described above in Scenario 7.

Action 702

In some examples, the wireless device 130 may have a coverage level under a coverage threshold. In such examples, the method may further comprise Action 702. In this Action 702, as shown in the example of FIG. 7 the wireless device 130 receives the second configuration from the first network node 111 configuring the wireless device 130 to save the first message of the second type of information received on the second set of frequencies, and combine the first message with at least the second message transmitted solely to the wireless device 130. A particular example of this is described above in Scenario 4.

Receiving the second configuration in this Action 702, as shown in FIG. 7a, may be understood as the wireless device 130 implementing the second configuration, that is, configuring itself according to the second configuration received from the first network node 111.

The first type of information may provide the indication to the wireless device 130 about the second type of information being transmitted in the second set of time-frequency resources. A particular example of this is described above in Scenario 5.

Action 703

In some embodiments, the method may further comprise the following action 703. According to Action 703, the wireless device 130 may receive any of the first type of information on the first set of time-frequency resources and the second type of information on the at least one second set of time-frequency resources. Reception may be via e.g., any of the first link 141, the second link 142, and the third link 143.

To summarize the foregoing in other words, with NB-IoT as illustrative example, the methods described herein may be based on MBMS SC-PtM, which may be adapted to make it compatible and suitable for NB-IoT, especially when multi-PRB operations may be configured in the system. The NB-IoT devices may need to receive the information that a multicast service may be redirected to a secondary PRB. In addition, the NB-IoT devices may be grouped according to their coverage levels, and use different secondary PRBs, or share the same secondary PRB but multiplexed in time. Also, service differentiation may be applied by using separate/different secondary PRBs for different services.

According to the description provided above, embodiments herein may be understood to relate to single point to multi points or multicast in a NB-IoT system. According to some examples of embodiments herein, may be understood to relate to using NB-IoT multi-PRB functionality to provide multicast services, or alternatively, use different eMTC narrowbands to provide multicast services to MTC UEs.

One advantage of embodiments herein is that methods herein allow the usage of multicast services in MTC devices, specifically in UEs based on the eMTC and NB-IoT work, that is, UEs based on categories M1 and NB1, and possible future categories specified beyond these. This results in savings in battery consumption, resource usage and time, when the intention is to transmit the same data to multiple UEs. By using secondary PRBs for multicast data, higher capacity for multicast may be achieved since the NB-PSS/SSS, NB-IoT Physical Broadcast Channel (NB-PBCH) and SIBs may be transmitted on the anchor PRB.

Figure 8A:
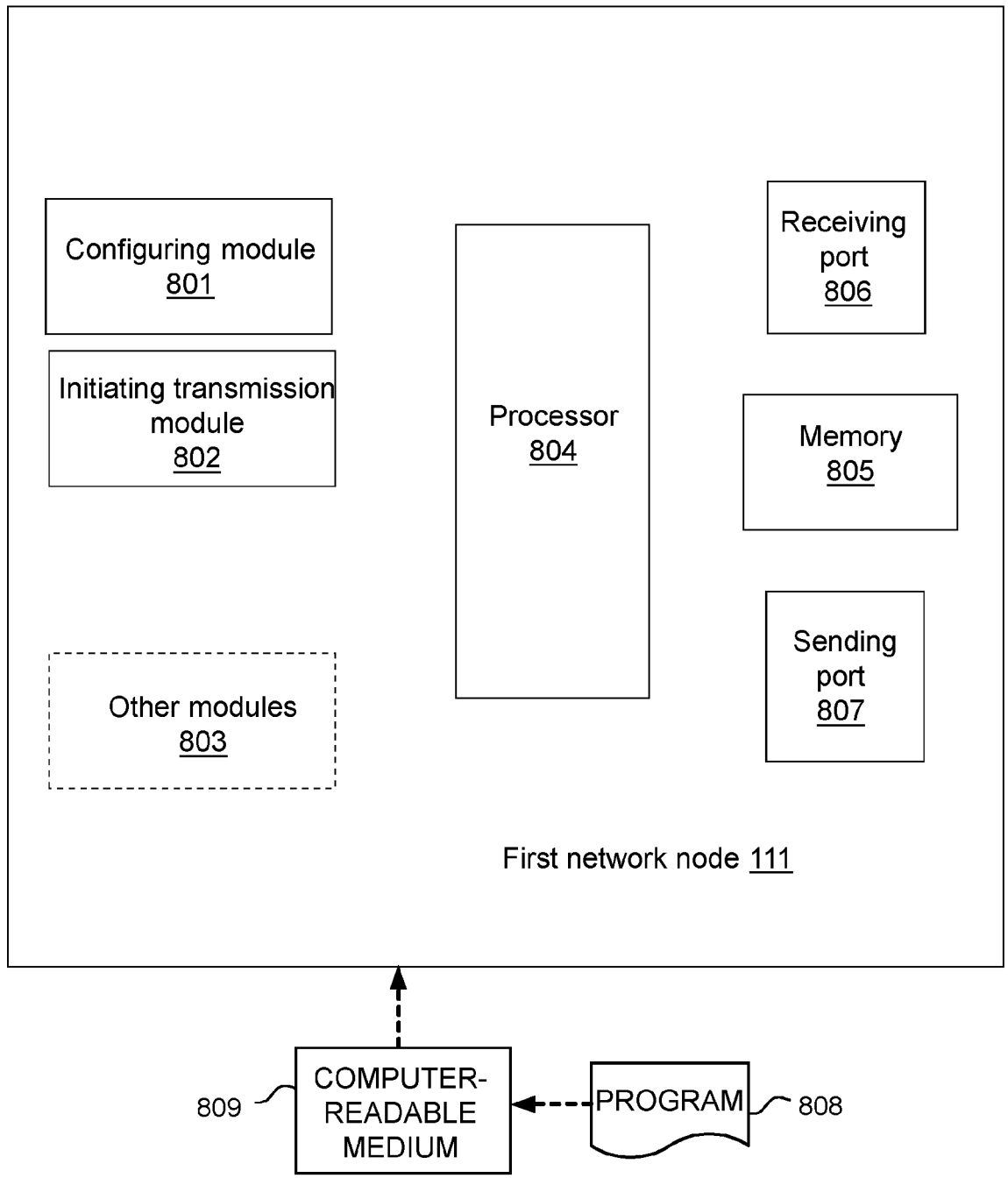
FIG. 8*a* is a schematic block diagram illustrating an example embodiment of a first network node, according to embodiments herein.

To perform the method actions described above in relation to FIG. 6, the first network node 111 may comprise the following arrangement depicted in FIG. 8*a*. As stated earlier, the first network node 111 is configured to operate in the wireless communications network 100.

The detailed description of some of the following corresponds to the same references provided above, in relation to the actions described for the first network node 111, and will thus not be repeated here. For example, the wireless communications network 100 comprises the first group of wireless devices 131 configured to support transmission with the first bandwidth under the threshold and the second group of wireless devices 132 configured to support transmission with the second bandwidth over the threshold.

It should be noted that the examples herein are not mutually exclusive. Components from one example may be tacitly assumed to be present in another example and it will be obvious to a person skilled in the art how those components may be used in the other examples.

The first network node 111 is further configured to perform the configuring 601 action, e.g., by means of a configuring module 801 within the first network node 111 configured to, configure the wireless device 130 comprised in the first group of wireless devices 131. The wireless device 130 is configured to have the first set of time-frequency resources to carry the first type of information between the second network node 112 configured to operate in the wireless communications network 100 and the wireless device 130. The first network node 111 is configured to configure the wireless device 130 with at least the second set of time-frequency resources to carry the second type of information between the second network node 112 and the wireless device 130. The second type of information is configured to be transmitted simultaneously to the first group of wireless devices 131. The first type of information is configured to be transmitted to at least one of: i) the first group of wireless devices 131 and the second group of wireless devices 132, and ii) the wireless device 130. The first set of time-frequency resources and the at least one second set of time-frequency resources are configured to be in at least one of: a) different sets of frequencies and b) different transmission time periods. The configuring module 801 may be a processor 804 of the first network node 111, or an application running on such processor.

In some embodiments, to configure may be further configured to be based on at least one of: a) the coverage level of the wireless device 130, b) the one or more coverage levels of the first group of wireless devices 131, c) the number of wireless devices comprised in the first group of wireless devices 131, d) the service type of the second type of information, and e) whether the second type of information comprises data or control information.

In some embodiments, at least one of the following may hold: the coverage level of the wireless device 130 may be the number of repetitions that may be configured to be required by the wireless device 130, and the one or more coverage levels of the first group of wireless devices 131 may be the number of repetitions that may be configured to be required by the first group of wireless devices 131.

The first group of wireless devices 131 may be configured to operate in the wireless communications network 100 with one of: Machine-type Communication, MTC, and Narrow Band-Internet of Things, NB-IoT, wherein a) the second type of information may be configured to be based on a Broadcast Multicast Service, and b) the second type of information may be configured to be transmitted with at least one of: Multicast-Broadcast Single Frequency Network, MBSFN, and Single Cell Point-to-Multipoint, SC-PtM.

In some embodiments, the first set of time-frequency resources may be configured to be on the first set of frequencies and the second set of time-frequency resources may be configured to be on the second set of frequencies, and wherein the first set of frequencies may be configured to be different and disjoint from the second set of frequencies.

The second set of frequencies may comprise at least the first subset of frequencies and the second subset of frequencies, wherein each of the first subset of frequencies and the second subset of frequencies may be configured to transmit to different subgroups of wireless devices within the first group of wireless devices 131, based on the coverage level of the wireless devices within each of the subgroups.

In some embodiments, the second set of frequencies may be configured to comprise at least the first subset of frequencies and the second subset of frequencies. Each of the first subset of frequencies and the second subset of frequencies may be configured to transmit to different subgroups of wireless devices within the first group of wireless devices 131, based on the service type of the second type of information to be transmitted to the wireless devices within each of the subgroups.

The second set of time-frequency resources on the second set of frequencies may be configured to carry information transmitted to different subgroups of wireless devices within the first group of wireless devices 131, at different time periods, based on the coverage level of the wireless devices within each of the subgroups.

In some embodiments, each of the first set of time-frequency resources and the second set of time-frequency resources may be configured to be on one of: a) the first set of frequencies and b) the second set of frequencies, based on the time when they are transmitted.

The first set of time-frequency resources may be configured to be in the anchor carrier, and the at least one second set of time-frequency resources may be configured to be on the secondary carrier.

The first network node 111 may be configured to perform the configuring 602 action as described above, e.g., by means of the configuring module 801 within the first network node 111 further configured to perform the configuring of Action 602.

The first network node 111 may be configured to perform the initiating transmission 603 action as described above, e.g. by means of the initiating transmission module 802 within the first network node 111. The initiating transmission module 802 may be the processor 804 of the first network node 111, or an application running on such processor.

Other modules 803 may be comprised in the first network node 111.

The embodiments herein may be implemented through one or more processors, such as a processor 804 in the first network node 111 depicted in FIG. 8a, together with computer program code for performing the functions and actions of the embodiments herein. A processor may be understood herein as a hardware component, that is, a processing circuitry. Hence, the processor 804 may also be referred to as a processing circuitry 804. The program code mentioned above may also be provided as a computer program product, for instance in the form of a data carrier carrying computer program code for performing the embodiments herein when being loaded into the in the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 805 comprising one or more memory units. The memory 805 is arranged to be used to store obtained information, store data, configurations, schedulings, and applications etc. to perform the methods herein when being executed in the first network node 111.

In some embodiments, the first network node 111 may receive information from the wireless device 130, through a receiving port 806. In some embodiments, the receiving port 806 may be, for example, connected to one or more antennas in first network node 111. In other embodiments, the first network node 111 may receive information from another structure in the wireless communications network 100 through the receiving port 806. Since the receiving port 806 may be in communication with the processor 804, the receiving port 806 may then send the received information to the processor 804. The receiving port 806 may also be configured to receive other information.

The processor 804 in the first network node 111 may be further configured to transmit or send information to e.g., the wireless device 130, through a sending port 807, which may be in communication with the processor 804, and the memory 805.

The first network node 111 may comprise an interface unit to facilitate communications between the first network node 111 and other nodes or devices, e.g., the wireless device 130. The interface may, for example, include a transceiver configured to transmit and receive radio signals over an air interface in accordance with a suitable standard.

Those skilled in the art will also appreciate that the configuring module 801, the initiating transmission module 802, and the other modules 803 described above may refer to a combination of analog and digital modules, and/or one or more processors configured with software and/or firmware, e.g., stored in memory, that, when executed by the one or more processors such as the processor 804, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 801-803 described above may be implemented as one or more applications running on one or more processors such as the processor 804.

Thus, the methods according to the embodiments described herein for the first network node 111 may be respectively implemented by means of a computer program 808 product, comprising instructions, i.e., software code portions, which, when executed on at least one processor 804, cause the at least one processor 804 to carry out the actions described herein, as performed by the first network node 111. The computer program 808 product may be stored on a computer-readable storage medium 809. The computer-readable storage medium 809, having stored thereon the computer program 808, may comprise instructions which, when executed on at least one processor 804, cause the at least one processor 804 to carry out the actions described herein, as performed by the first network node 111. In some embodiments, the computer-readable storage medium 809 may be a non-transitory computer-readable storage medium, such as a CD ROM disc, a memory stick, or stored in the cloud space. In other embodiments, the computer program 808 product may be stored on a carrier containing the computer program, wherein the carrier is one of an electronic signal, optical signal, radio signal, or the computer-readable storage medium 809, as described above.

Figure 8B:
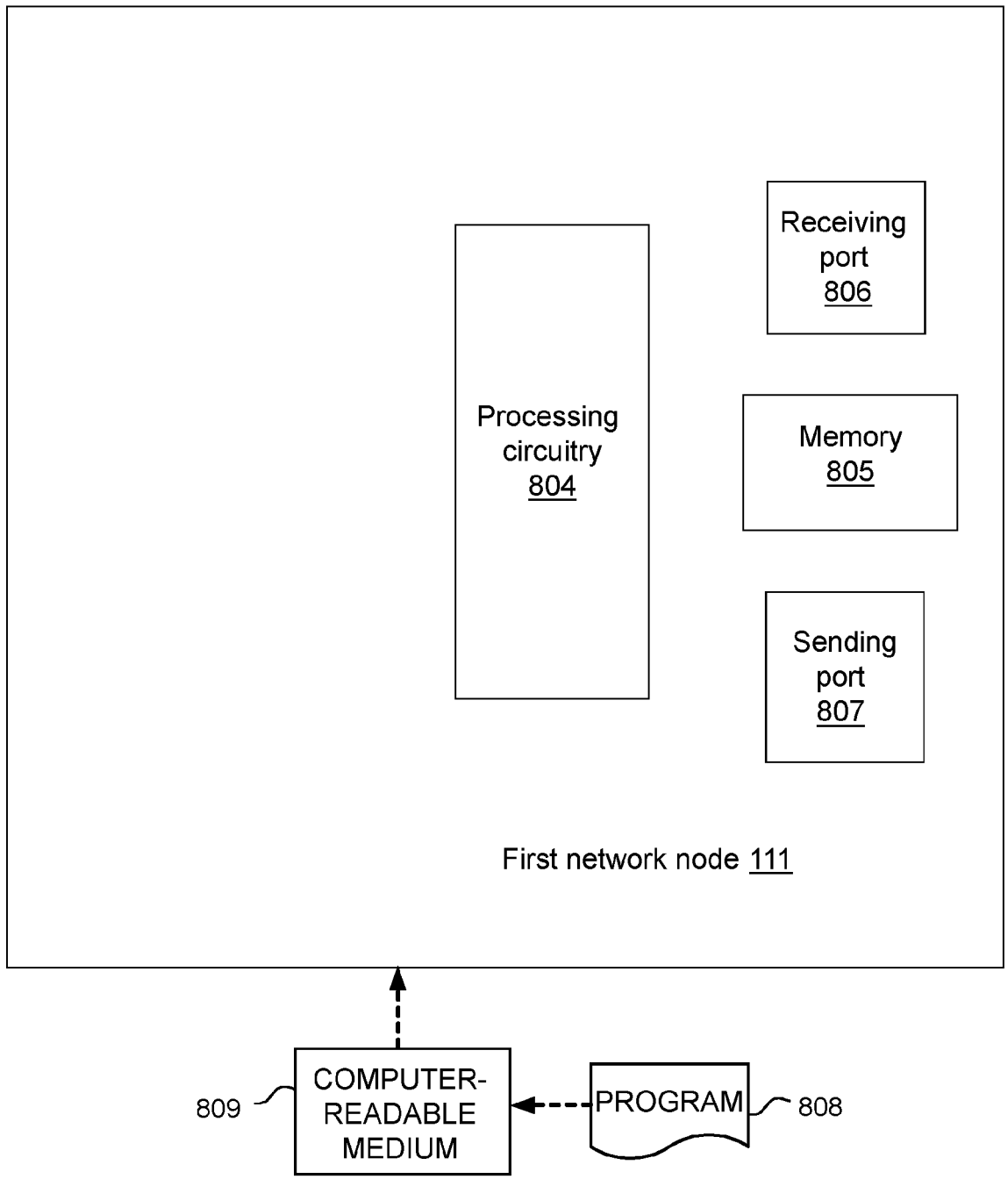
FIG. 8*b* is a schematic block diagram illustrating another example of an embodiment of a first network node, according to embodiments herein.

In other examples, to perform the method actions described above in relation to FIG. 6, the first network node 111 may comprise the following arrangement depicted in FIG. 8b. The first network node 111 may comprise the processing circuitry 804, in the first network node 111, the memory 805, the receiving port 806, the sending port 807, the program 808 and the computer-readable medium 809. The memory 805 may comprise instructions executable by the processing circuitry 804 whereby the first network node 111 may be configured to perform one or more of the method actions according to FIG. 6.

Figure 9A:
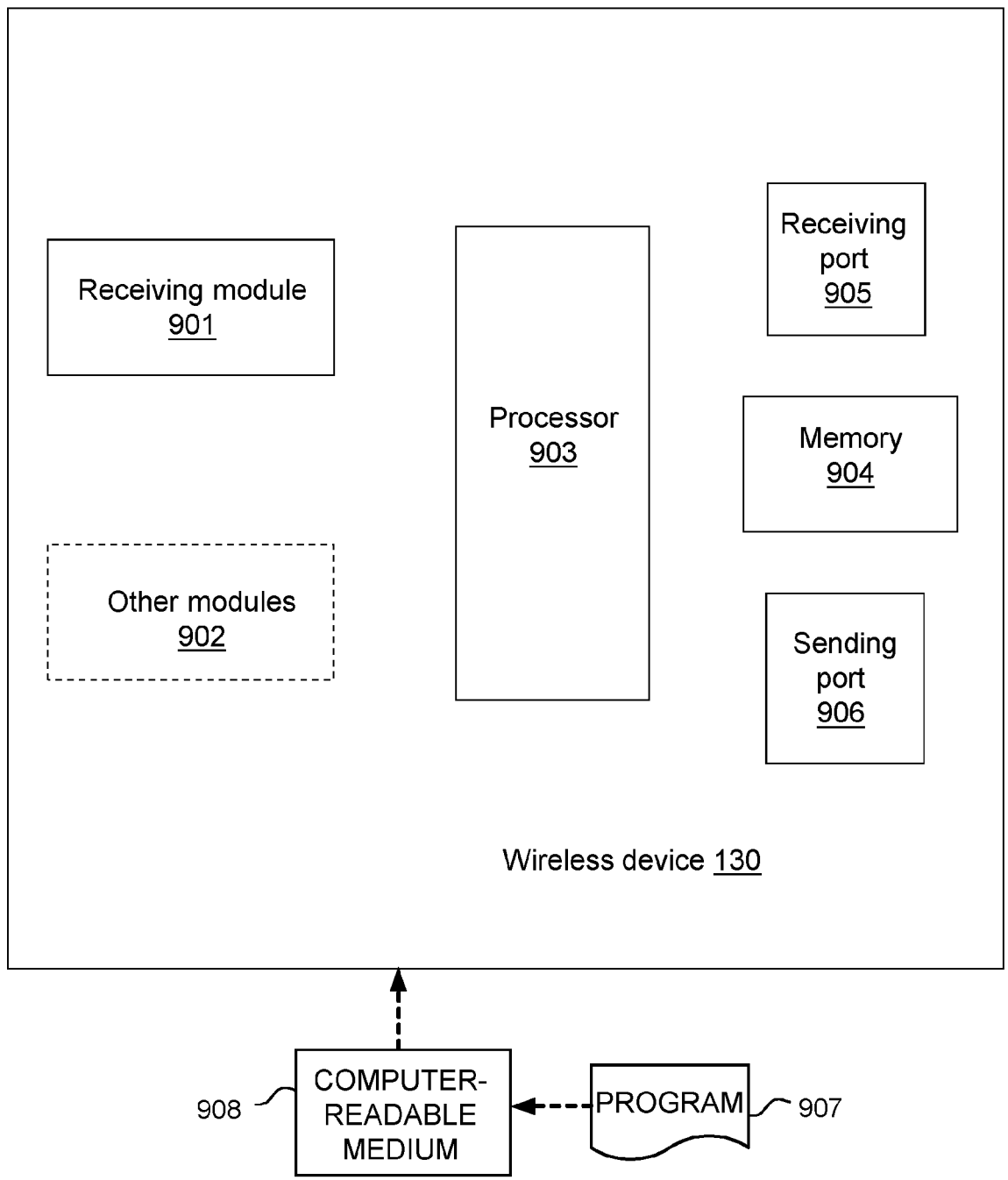
FIG. 9*a* is a schematic block diagram illustrating an embodiments of a wireless device, according to embodiments herein.

To perform the method actions described above in relation to FIG. 7, the wireless device 130 may comprise the following arrangement depicted in FIG. 9a. As stated earlier, the wireless device 130 is configured to operate in a wireless communications network 100.

The detailed description of some of the following corresponds to the same references provided above, in relation to the actions described for the wireless device 130, and will thus not be repeated here. For example, the wireless communications network 100 comprises the first group of wireless devices 131 configured to support transmission with the first bandwidth under the threshold and the second group of wireless devices 132 configured to support transmission with the second bandwidth over the threshold. The wireless device 130 is comprised in the first group of wireless devices 131.

It should be noted that the examples herein are not mutually exclusive. Components from one example may be tacitly assumed to be present in another example and it will be obvious to a person skilled in the art how those components may be used in the other examples.

The wireless device 130 is further configured to perform the receiving 701 action, e.g. by means of a receiving module 901 within the wireless device 130 configured to, receive the first configuration from the first network node 111 configured to operate in the wireless communications network 100. The wireless device 130 is configured to have the first set of time-frequency resources to carry the first type of information between the second network node 112 configured to operate in the wireless communications network 100 and the wireless device 130. The first configuration is configured to configure the wireless device 130 with at least the second set of time-frequency resources to carry the second type of information between the second network node 112 and the wireless device 130. The second type of information is configured to be transmitted simultaneously to the first group of wireless devices 131. The first type of information is configured to be transmitted to at least one of: i) the first group of wireless devices 131 and the second group of wireless devices 132, and ii) the wireless device 130. The first set of time-frequency resources and the at least one second set of time-frequency resources are configured to be in at least one of: a) different sets of frequencies and b) different transmission time periods. The receiving module 901 may be a processor 903 of the wireless device 130, or an application running on such processor.

In some embodiments, the first configuration may be further configured to be based on at least one of: a) the coverage level of the wireless device 130, b) the one or more coverage levels of the first group of wireless devices 131, c) the number of wireless devices comprised in the first group of wireless devices 131, d) the service type of the second type of information, and e) whether the second type of information comprises data or control information.

In some embodiments, at least one of the following may hold: the coverage level of the wireless device 130 may be the number of repetitions that may be configured to be required by the wireless device 130, and the one or more coverage levels of the first group of wireless devices 131 may be the number of repetitions that may be configured to be required by the first group of wireless devices 131.

The first group of wireless devices 131 may be configured to operate in the wireless communications network 100 with one of: Machine-type Communication, MTC, and Narrow Band-Internet of Things, NB-IoT, wherein a) the second type of information may be configured to be based on a Broadcast Multicast Service, and b) the second type of information may be configured to be transmitted with at least one of: Multicast-Broadcast Single Frequency Network, MBSFN, and Single Cell Point-to-Multipoint, SC-PtM.

In some embodiments, the first set of time-frequency resources may be configured to be on the first set of frequencies and the second set of time-frequency resources may be configured to be on the second set of frequencies, and wherein the first set of frequencies may be configured to be different and disjoint from the second set of frequencies.

The second set of frequencies may comprise at least the first subset of frequencies and the second subset of frequencies, wherein each of the first subset of frequencies and the second subset of frequencies may be configured to transmit to different subgroups of wireless devices within the first group of wireless devices 131, based on the coverage level of the wireless devices within each of the subgroups.

In some embodiments, the second set of frequencies may be configured to comprise at least the first subset of frequencies and the second subset of frequencies. Each of the first subset of frequencies and the second subset of frequencies may be configured to transmit to different subgroups of wireless devices within the first group of wireless devices 131, based on the service type of the second type of information to be transmitted to the wireless devices within each of the subgroups.

The second set of time-frequency resources on the second set of frequencies may be configured to carry information transmitted to different subgroups of wireless devices within the first group of wireless devices 131, at different time periods, based on the coverage level of the wireless devices within each of the subgroups.

In some embodiments, each of the first set of time-frequency resources and the second set of time-frequency resources may be configured to be on one of: a) the first set of frequencies and b) the second set of frequencies, based on the time when they are transmitted.

The first set of time-frequency resources may be configured to be in an anchor carrier, and the at least one second set of time-frequency resources may be configured to be on a secondary carrier.

The wireless device 130 may be configured to perform the receiving 702 action as described above, e.g. by means of the receiving module 901 within the wireless device 130, further configured to perform the receiving of Action 702.

The wireless device 130 may be configured to perform the receiving 703 action as described above, e.g. by means of the receiving module 901 within the wireless device 130. The wireless device 130 may be configured to perform this receiving 703 action, e.g. by means of the receiving module 901 within the wireless device 130, further configured to perform the receiving of Action 703.

Other modules 902 may be comprised in the wireless device 130.

The embodiments herein may be implemented through one or more processors, such as a processor 903 in the wireless device 130 depicted in FIG. 9a, together with computer program code for performing the functions and actions of the embodiments herein. The processor 903 may also be referred to as a processing circuitry 903. The program code mentioned above may also be provided as a computer program product, for instance in the form of a data carrier carrying computer program code for performing the embodiments herein when being loaded into the in the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 904 comprising one or more memory units. The memory 904 is arranged to be used to store obtained information, store data, configurations, schedulings, and applications etc. to perform the methods herein when being executed in the wireless device 130.

In some embodiments, the wireless device 130 may receive information from the first network node 111, through a receiving port 905. In some embodiments, the receiving port 905 may be, for example, connected to one or more antennas in wireless device 130. In other embodiments, the wireless device 130 may receive information from another structure in the wireless communications network 100 through the receiving port 905. Since the receiving port 905 may be in communication with the processor 903, the receiving port 905 may then send the received information to the processor 903. The receiving port 905 may also be configured to receive other information.

The processor 903 in the wireless device 130 may be further configured to transmit or send information to e.g., the wireless device 130, through a sending port 906, which may be in communication with the processor 903, and the memory 904.

The wireless device 130 may comprise an interface unit to facilitate communications between the wireless device 130 and other nodes or devices, e.g., the first network node 111 and/or the second network node 112. The interface may, for example, include a transceiver configured to transmit and receive radio signals over an air interface in accordance with a suitable standard.

Those skilled in the art will also appreciate that the receiving module 901 and the other modules 902 described above may refer to a combination of analog and digital modules, and/or one or more processors configured with software and/or firmware, e.g., stored in memory, that, when executed by the one or more processors such as the processor 903, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 901-902 described above may be implemented as one or more applications running on one or more processors such as the processor 903.

Thus, the methods according to the embodiments described herein for the wireless device 130 may be respectively implemented by means of a computer program 907 product, comprising instructions, i.e., software code portions, which, when executed on at least one processor 903, cause the at least one processor 903 to carry out the actions described herein, as performed by the wireless device 130. The computer program 907 product may be stored on a computer-readable storage medium 908. The computer-readable storage medium 908, having stored thereon the computer program 907, may comprise instructions which, when executed on at least one processor 903, cause the at least one processor 903 to carry out the actions described herein, as performed by the wireless device 130. In some embodiments, the computer-readable storage medium 908 may be a non-transitory computer-readable storage medium, such as a CD ROM disc, a memory stick, or stored in the cloud space. In other embodiments, the computer program 907 product may be stored on a carrier containing the computer program, wherein the carrier is one of an electronic signal, optical signal, radio signal, or the computer-readable storage medium 908, as described above.

Figure 9B:
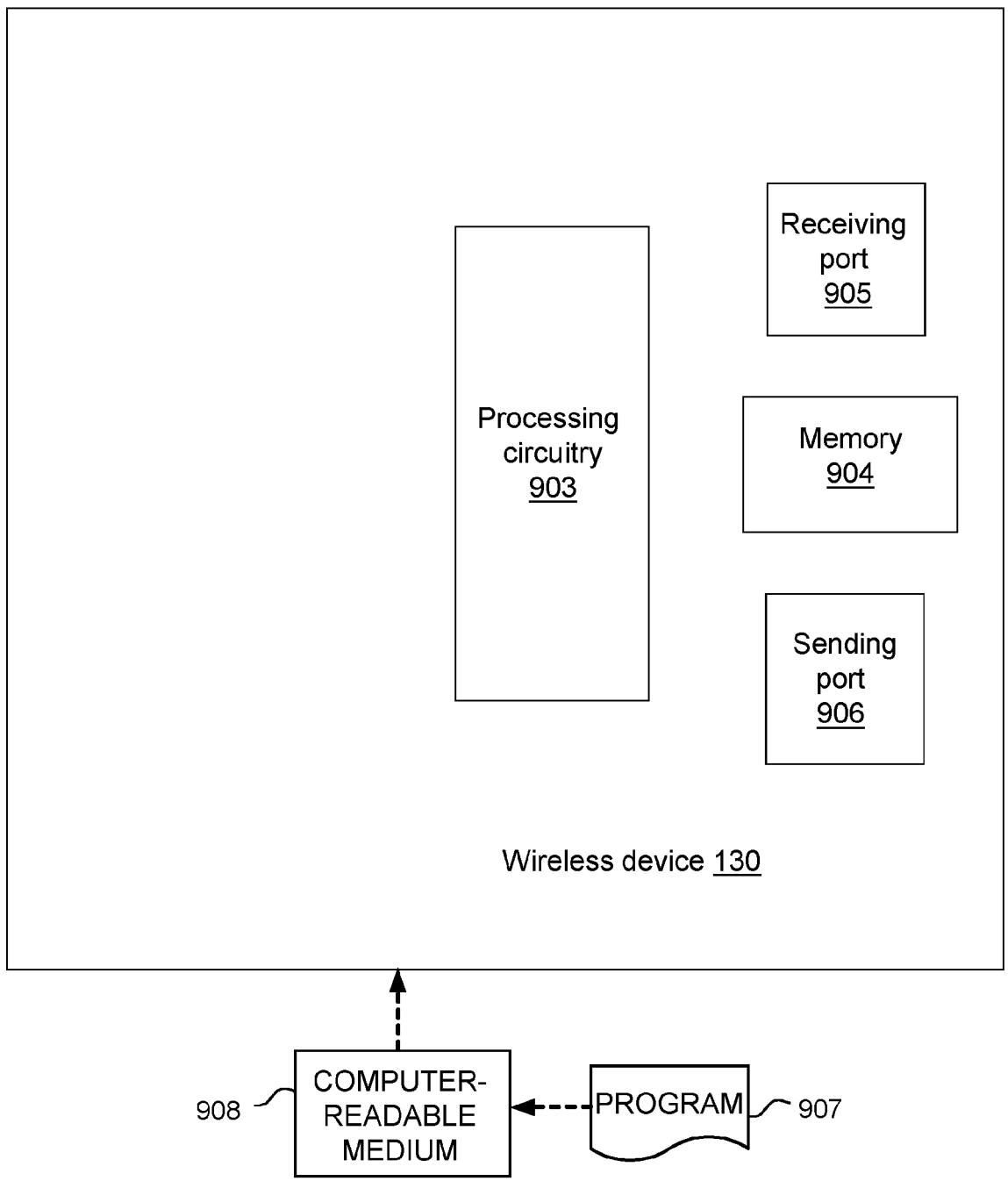
FIG. 9*b* is a schematic block diagram illustrating another example of an embodiment of a wireless device, according to embodiments herein.

In other examples, to perform the method actions described above in relation to FIG. 7, the wireless device 130 may comprise the following arrangement depicted in FIG. 9*b*. The wireless device 130 may comprise the processing circuitry 903, in the wireless device 130, the memory 904, the receiving port 905, the sending port 906, the program 907 and the computer-readable medium 908. The memory 904 may comprise instructions executable by the processing circuitry 903 whereby the wireless device 130 may be configured to perform one or more of the method actions according to FIG. 7.

In some examples of any of the examples described herein, any of the wireless devices comprised in the first group of wireless devices 131 may operate in the wireless communications network 100 wherein a wideband carrier may be transmitted within a spectral mask of an allocated frequency band such that guard bands, on which the wideband carrier does not transmit, may occupy the frequencies above and below the wideband carrier and within the spectral mask. Any of the wireless devices comprised in the first group of wireless devices 131 may include a module, or processing circuitry, which may be configured to transmit a narrowband carrier in an expanded guard band of the wideband carrier at a frequency such that the transmission is orthogonal to the wideband carrier transmissions. In the case of the wireless device 130, the module may be the processor 903 of the wireless device 130, or an application running on such processor. The wideband carrier may be transmitted at a frequency within a downlink allocated frequency band that is shifted from its nominal position at or near the center of the frequency band, in one of a higher or lower frequency direction, by an integral multiple of a predetermined grid spacing, so as to reduce a guard band on one side of the wideband carrier and expand a guard band on the other side of the wideband carrier. The module or processing circuitry may be further configured to receive a wideband carrier frequency within an uplink allocated frequency band wherein any shift from its nominal position at or near the center of the frequency band may be offset from the downlink wideband carrier frequency shift. The module or processing circuitry may be further configured to receive a narrowband carrier frequency within the uplink allocated frequency band in one or both guard bands of the wideband carrier frequency.

When using the word "comprise" or "comprising", it shall be interpreted as non-limiting, i.e. meaning "consist at least of".

Embodiments herein may relate to Machine-Type Communications (MTC), enhanced MTC (eMTC), Narrowband Internet of Things (NB-IoT), multicast, broadcast, networked society, feedback, coverage enhancement, Category M1 (Cat-M1), Category Narrow Band 1 (Cat-NB1), Single-Cell Point-to-Multipoint (SC-PtM).

The embodiments herein are not limited to the above described preferred embodiments. Various alternatives, modifications and equivalents may be used. Therefore, the above embodiments should not be taken as limiting the scope of the invention.

REFERENCES

[1] R1-161548, "RAN1 agreements for Rel-13 NB-IoT", Ericsson, 3GPP TSG-RAN WG1 Meeting #84, St. Julian's, Malta, February 2016
[2] R1-160259 "NB-IoT—NB-PBCH design", Ericsson, 3GPP TSG-RAN WG1 Meeting #84, St. Julian's, Malta, February 2016
[3] 3GPP TS 36.331, "Radio Resource Control (RRC) protocol specification", v13.1.0, March 2016
[4] 3GPP TS 36.321, "Medium Access Control (MAC) protocol specification", v13.1.0, March 2016

The invention claimed is:
1. A method performed by a first network node operating in a wireless communications network, wherein the wireless communications network comprises a first group of wireless devices supporting transmission with a first bandwidth under a threshold and a second group of wireless devices supporting transmission with a second bandwidth over the threshold, the method comprising:

configuring a wireless device comprised in the first group of wireless devices, the wireless device having a first set of time-frequency resources to carry a first type of information between a second network node operating in the wireless communications network and the wireless device, with:

at least one second set of time-frequency resources to carry a second type of information between the second network node and the wireless device, wherein the second type of information is to be transmitted simultaneously to the first group of wireless devices, and wherein the first type of information is to be transmitted to at least one of: i) the first group of wireless devices and the second group of wireless devices, and ii) the wireless device, and wherein the first set of time-frequency resources and the at least one second set of time-frequency resources are in at least one of: (a) different sets of frequencies and (b) different transmission time periods, and have different coverages wherein transmission of the second type of information is enabled to reach the first group of wireless devices supporting transmission with the first bandwidth under the threshold.

2. The method according to claim 1, wherein the configuring is further based on at least one of: a) a coverage level of the wireless device, b) one or more coverage levels of the first group of wireless devices, c) a number of wireless devices comprised in the first group of wireless devices, d) a service type of the second type of information, and e) whether the second type of information comprises data or control information.

3. The method according to claim 2, wherein at least one of the following holds: the coverage level of the wireless device is a number of repetitions required by the wireless device, and the one or more coverage levels of the first group of wireless devices is a number of repetitions required by the first group of wireless devices.

4. The method according to claim 1, wherein the first group of wireless devices operates in the wireless communications network with one of: Machine-type Communication, MTC, and Narrow Band-Internet of Things, NB-IoT, and wherein a) the second type of information is based on a Broadcast Multicast Service, and b) the second type of information is transmitted with at least one of: Multicast-Broadcast Single Frequency Network, MBSFN, and Single Cell Point-to-Multipoint, SC-PtM.

5. The method according to claim 1, wherein the first set of time-frequency resources is on a first set of frequencies and the second set of time-frequency resources is on a second set of frequencies, and wherein the first set of frequencies is different and disjoint from the second set of frequencies.

6. The method according to claim 5, wherein the second set of frequencies comprises at least a first subset of frequencies and a second subset of frequencies, and wherein each of the first subset of frequencies and the second subset of frequencies is configured to transmit to different subgroups of wireless devices within the first group of wireless devices, based on a coverage level of the wireless devices within each of the subgroups.

7. The method according to claim 5, wherein the second set of frequencies comprises at least a first subset of frequencies and a second subset of frequencies, and wherein each of the first subset of frequencies and the second subset of frequencies is configured to transmit to different subgroups of wireless devices within the first group of wireless devices, based on a service type of the second type of information to be transmitted to the wireless devices within each of the subgroups.

8. The method according to claim 5, wherein the second set of time-frequency resources on the second set of frequencies is configured to carry information transmitted to different subgroups of wireless devices within the first group of wireless devices, at different time periods, based on a coverage level of the wireless devices within each of the subgroups.

9. The method according to claim 1, wherein each of the first set of time-frequency resources and the second set of time-frequency resources is on one of: a) a first set of frequencies and b) a second set of frequencies, based on a time when they are transmitted.

10. The method of claim 1, wherein the first set of time-frequency resources is in an anchor carrier, and the at least one second set of time-frequency resources is on a secondary carrier.

11. A computer program, comprising instructions which, when executed on at least one processor, cause the at least one processor to carry out the method according to claim 1.

12. A computer-readable storage medium, having stored thereon a computer program, comprising instructions which, when executed on at least one processor, cause the at least one processor to carry out the method according to claim 1.

13. A method performed by a wireless device operating in a wireless communications network, wherein the wireless communications network comprises a first group of wireless devices supporting transmission with a first bandwidth under a threshold and a second group of wireless devices supporting transmission with a second bandwidth over the threshold, and wherein the wireless device is comprised in the first group of wireless devices, the method comprising:

receiving a first configuration from a first network node operating in the wireless communications network, the wireless device having a first set of time-frequency resources to carry a first type of information between a second network node operating in the wireless communications network and the wireless device, and the first configuration configuring the wireless device with:

at least one second set of time-frequency resources to carry a second type of information between the second network node and the wireless device, wherein the second type of information is to be transmitted simultaneously to the first group of wireless devices, and wherein the first type of information is to be transmitted to at least one of: i) the first group of wireless devices and the second group of wireless devices, and ii) the wireless device, and wherein the first set of time-frequency resources and the at least one second set of time-frequency resources are in at least one of: (a) different sets of frequencies and (b) different transmission time periods, and have different coverages, wherein transmission of the second type of information is enabled to reach the first group of wireless devices supporting transmission with the first bandwidth under the threshold.

14. The method according to claim 13, wherein the first configuration is further based on at least one of: a) a coverage level of the wireless device, b) one or more coverage levels of the first group of wireless devices, c) a number of wireless devices comprised in the first group of wireless devices, d) a service type of the second type of information, and e) whether the second type of information comprises data or control information.

15. The method according to claim 14, wherein at least one of the following holds: the coverage level of the wireless device is a number of repetitions required by the wireless device, and the one or more coverage levels of the first group of wireless devices is a number of repetitions required by the first group of wireless devices.

16. The method according to claim 13, wherein the first group of wireless devices operates in the wireless communications network with one of: Machine-type Communication, MTC, and Narrow Band-Internet of Things, NB-IoT, and wherein a) the second type of information is based on a Broadcast Multicast Service, and b) the second type of information is transmitted with at least one of: Multicast-Broadcast Single Frequency Network, MBSFN, and Single Cell Point-to-Multipoint, SC-PtM.

17. The method according to claim 13, wherein the first set of time-frequency resources is on a first set of frequencies and the second set of time-frequency resources is on a second set of frequencies, and wherein the first set of frequencies is different and disjoint from the second set of frequencies.

18. The method according to claim 17, wherein second set of frequencies comprises at least a first subset of frequencies and a second subset of frequencies, and wherein each of the first subset of frequencies and the second subset of frequencies is configured to transmit to different subgroups of wireless devices within the first group of wireless devices, based on a coverage level of the wireless devices within each of the subgroups.

19. The method according to claim 17, wherein the second set of frequencies is configured to comprise at least a first subset of frequencies and a second subset of frequencies, and wherein each of the first subset of frequencies and the second subset of frequencies is configured to transmit to different subgroups of wireless devices within the first group of wireless devices, based on a service type of the second type of information to be transmitted to the wireless devices within each of the subgroups.

20. The method according to claim 17, wherein the second set of time-frequency resources on the second set of frequencies is configured to carry information transmitted to different subgroups of wireless devices within the first group of wireless devices, at different time periods, based on a coverage level of the wireless devices within each of the subgroups.

21. The method according to claim 13, wherein each of the first set of time-frequency resources and the second set of time-frequency resources is on one of: a) a first set of frequencies and b) a second set of frequencies, based on a time when they are transmitted.

22. The method of claim 13, wherein the first set of time-frequency resources is in an anchor carrier, and the at least one second set of time-frequency resources is a secondary carrier.

23. A computer program, comprising instructions which, when executed on at least one processor, cause the at least one processor to carry out the method according to claim 13.

24. A computer-readable storage medium, having stored thereon a computer program, comprising instructions which, when executed on at least one processor, cause the at least one processor to carry out the method according to claim 13.

25. A first network node configured to operate in a wireless communications network, wherein the wireless communications network comprises a first group of wireless devices configured to support transmission with a first bandwidth under a threshold and a second group of wireless devices configured to support transmission with a second bandwidth over the threshold, the first network node being further configured to:
configure a wireless device comprised in the first group of wireless devices, the wireless device being configured to have a first set of time-frequency resources to carry a first type of information between a second network node configured to operate in the wireless communications network and the wireless device, with:
at least one second set of time-frequency resources to carry a second type of information between the second network node and the wireless device,
wherein the second type of information is configured to be transmitted simultaneously to the first group of wireless devices, and wherein the first type of information is configured to be transmitted to at least one of: i) the first group of wireless devices and the second group of wireless devices, and ii) the wireless device, and
wherein the first set of time-frequency resources and the at least one second set of time-frequency resources are configured to be in at least one of: (a) different sets of frequencies and (b) different transmission time periods, and have different coverages, wherein transmission of the second type of information is enabled to reach the first group of wireless devices supporting transmission with a first bandwidth under a threshold.

26. The first network node according to claim 25, wherein to configure is further configured to be based on at least one of: a) a coverage level of the wireless device, b) one or more coverage levels of the first group of wireless devices, c) a number of wireless devices comprised in the first group of wireless devices, d) a service type of the second type of information, and e) whether the second type of information comprises data or control information.

27. The first network node according to claim 26, wherein at least one of the following holds: the coverage level of the wireless device is a number of repetitions configured to be required by the wireless device, and the one or more coverage levels of the first group of wireless devices is a number of repetitions configured to be required by the first group of wireless devices.

28. The first network node according to claim 25, wherein the first group of wireless devices is configured to operate in the wireless communications network with one of: Machine-type Communication, MTC, and Narrow Band-Internet of Things, NB-IoT, and wherein a) the second type of information is configured to be based on a Broadcast Multicast Service, and b) the second type of information configured to be transmitted with at least one of: Multicast-Broadcast Single Frequency Network, MBSFN, and Single Cell Point-to-Multipoint, SC-PtM.

29. The first network node according to claim 25, wherein the first set of time-frequency resources is configured to be on a first set of frequencies and the second set of time-frequency resources is configured to be on a second set of frequencies, and wherein the first set of frequencies is configured to be different and disjoint from the second set of frequencies.

30. The first network node according to claim 29, wherein the second set of frequencies comprises at least a first subset of frequencies and a second subset of frequencies, and wherein each of the first subset of frequencies and the second subset of frequencies is configured to transmit to different subgroups of wireless devices within the first group of wireless devices, based on a coverage level of the wireless devices within each of the subgroups.

31. The first network node according to claim 29, wherein the second set of frequencies is configured to comprise at least a first subset of frequencies and a second subset of frequencies, and wherein each of the first subset of frequencies and the second subset of frequencies is configured to transmit to different subgroups of wireless devices within the first group of wireless devices, based on a service type of the second type of information to be transmitted to the wireless devices within each of the subgroups.

32. The first network node according to claim 29, wherein the second set of time-frequency resources on the second set of frequencies is configured to carry information transmitted to different subgroups of wireless devices within the first group of wireless devices, at different time periods, based on a coverage level of the wireless devices within each of the subgroups.

33. The first network node according to claim 25, wherein each of the first set of time-frequency resources and the second set of time-frequency resources is configured to be on one of: a) a first set of frequencies and b) a second set of frequencies, based on a time when they are transmitted.

34. The first network node of claim 25, wherein the first set of time-frequency resources is configured to be in an anchor carrier, and the at least one second set of time-frequency resources is configured to be on a secondary carrier.

35. A wireless device configured to operate in a wireless communications network, wherein the wireless communications network comprises a first group of wireless devices configured to support transmission with a first bandwidth under a threshold and a second group of wireless devices configured to support transmission with a second bandwidth over the threshold, and wherein the wireless device is comprised in the first group of wireless devices, the wireless device being further configured to:
   receive a first configuration from a first network node configured to operate in the wireless communications network, the wireless device being configured to have a first set of time-frequency resources to carry a first type of information between a second network node configured to operate in the wireless communications network and the wireless device, and the first configuration being configured to configure the wireless device with:
   at least one second set of time-frequency resources to carry a second type of information between the second network node and the wireless device,
   wherein the second type of information is configured to be transmitted simultaneously to the first group of wireless devices, and wherein the first type of information is configured to be transmitted to at least one of: i) the first group of wireless devices and the second group of wireless devices, and ii) the wireless device, and
   wherein the first set of time-frequency resources and the at least one second set of time-frequency resources are configured to be in at least one of: (a) different sets of frequencies and (b) different transmission time periods, and have different coverages, wherein transmission of the second type of information is enabled to reach the first group of wireless devices supporting transmission with a first bandwidth under a threshold.

36. The wireless device according to claim 35, wherein the first configuration is further configured to be based on at least one of: a) a coverage level of the wireless device, b) one or more coverage levels of the first group of wireless devices, c) a number of wireless devices comprised in the first group of wireless devices, d) a service type of the second type of information, and e) whether the second type of information comprises data or control information.

37. The wireless device according to claim 36, wherein at least one of the following holds: the coverage level of the wireless device is a number of repetitions configured to be required by the wireless device, and the one or more coverage levels of the first group of wireless devices is a number of repetitions configured to be required by the first group of wireless devices.

38. The wireless device according to claim 35, wherein the first group of wireless devices is configured to operate in the wireless communications network with one of: Machine-type Communication, MTC, and Narrow Band-Internet of Things, NB-IoT, and wherein a) the second type of information is configured to be based on a Broadcast Multicast Service, and b) the second type of information is configured to be transmitted with at least one of: Multicast-Broadcast Single Frequency Network, MBSFN, and Single Cell Point-to-Multipoint, SC-PtM.

39. The wireless device according to claim 35, wherein the first set of time-frequency resources is configured to be on a first set of frequencies and the second set of time-frequency resources is configured to be on a second set of frequencies, and wherein the first set of frequencies is configured to be different and disjoint from the second set of frequencies.

40. The wireless device according to claim 39, wherein second set of frequencies comprises at least a first subset of frequencies and a second subset of frequencies, and wherein each of the first subset of frequencies and the second subset of frequencies is configured to transmit to different subgroups of wireless devices within the first group of wireless devices, based on a coverage level of the wireless devices within each of the subgroups.

41. The wireless device according to claim 40, wherein the second set of frequencies is configured to comprise at least a first subset of frequencies and a second subset of frequencies, and wherein each of the first subset of frequencies and the second subset of frequencies is configured to transmit to different subgroups of wireless devices within the first group of wireless devices, based on a service type of the second type of information to be transmitted to the wireless devices within each of the subgroups.

42. The wireless device according to claim 40, wherein the second set of time-frequency resources on the second set of frequencies is configured to carry information transmitted to different subgroups of wireless devices within the first group of wireless devices, at different time periods, based on a coverage level of the wireless devices within each of the subgroups.

43. The wireless device according to claim 35, wherein each of the first set of time-frequency resources and the second set of time-frequency resources is configured to be on one of: a) a first set of frequencies and b) a second set of frequencies, based on a time when they are transmitted.

44. The wireless device of claim 35, wherein the first set of time-frequency resources is configured to be in an anchor carrier, and the at least one second set of time-frequency resources is configured to be on a secondary carrier.

* * * * *